United States Patent
Nishigaya

(10) Patent No.: US 7,988,165 B2
(45) Date of Patent: Aug. 2, 2011

(54) SUSPENSION APPARATUS FOR VEHICLE

(75) Inventor: Shinya Nishigaya, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/525,681

(22) PCT Filed: Feb. 8, 2009

(86) PCT No.: PCT/JP2008/052598
§ 371 (c)(1),
(2), (4) Date: Aug. 4, 2009

(87) PCT Pub. No.: WO2008/099946
PCT Pub. Date: Aug. 21, 2008

(65) Prior Publication Data
US 2010/0032921 A1     Feb. 11, 2010

(30) Foreign Application Priority Data

Feb. 15, 2007 (JP) ................................. 2007-035323

(51) Int. Cl.
*B60G 3/16* (2006.01)
*B60G 3/04* (2006.01)
(52) U.S. Cl. ..... 280/124.131; 280/124.15; 280/124.125; 280/124.116; 280/124.128; 280/124.167
(58) Field of Classification Search ............. 280/124.15, 280/124.125, 124.131, 124.132, 124.134, 280/124.164, 124.17, 124.116, 124.148, 280/124.156, 124.128, 124.167
See application file for complete search history.

(56) References Cited

U.S. PATENT DOCUMENTS 4,027,898 A * 6/1977 Steen ..................... 280/124.116
(Continued)

FOREIGN PATENT DOCUMENTS

CN         1502490 A     6/2004
(Continued)

OTHER PUBLICATIONS

Office Action from Chinese Application No. 200880005020.0 dated Dec. 9, 2010 with English translation; total of 8 pages.

*Primary Examiner* — Ruth Ilan
*Assistant Examiner* — Karen A Beck
(74) *Attorney, Agent, or Firm* — Gifford, Krass, Sprinkle, Anderson & Citkowski, P.C.

(57) ABSTRACT

A suspension apparatus for an automotive vehicle employs, as its main element, a main suspension member 10. The main suspension member 10 includes a main portion 12 constituted by a pipe; two body-side attachment portions 14, 16 that are fixed to opposite ends of the main portion 12, respectively; and a wheel-side attachment portion 18 that is fixed to a rear-side portion of the main portion 12. The opposite ends of the pipe constituting the main portion 12 are located near to each other, such that the main portion 12 has a generally C-shaped configuration in its side view. The body-side attachment portions 14, 16 are attached to a body of the vehicle such that those portions 14, 16 are pivotable about their pivotal axes. The pivotal axes of the two body-side attachment portions 14, 16 are offset from each other in a direction perpendicular to those axes, or are inclined relative to each other. Otherwise, those pivotal axes are offset from each other in the direction perpendicular thereto, and simultaneously are inclined relative to each other. The wheel-side attachment portion 18 is attached to a wheel-holding member, not shown, that holds a wheel 30 such that the wheel 30 is rotatable. Thus, the main suspension member 10 can function as both a suspension spring and a suspension link.

12 Claims, 18 Drawing Sheets

U.S. PATENT DOCUMENTS

| | | | |
|---|---|---|---|
| 4,953,667 A * | 9/1990 | Bigo | 188/31 |
| 6,382,649 B1 * | 5/2002 | Albers et al. | 280/124.17 |
| 6,752,409 B1 | 6/2004 | Kunert | |
| 7,455,306 B2 * | 11/2008 | Ramsey et al. | 280/124.128 |
| 7,770,907 B2 * | 8/2010 | Shimizu et al. | 280/124.134 |
| 2002/0175487 A1 | 11/2002 | Lawson | |
| 2004/0100062 A1 | 5/2004 | Inoue et al. | |
| 2006/0012142 A1 * | 1/2006 | Satou et al. | 280/124.15 |

FOREIGN PATENT DOCUMENTS

| | | |
|---|---|---|
| EP | 0867318 A1 | 9/1998 |
| EP | 1422081 A2 | 5/2004 |
| FR | 2325529 A1 | 4/1977 |
| FR | 2787389 A1 | 6/2000 |
| FR | 2810927 A1 | 1/2002 |
| GB | 2010759 A | 7/1979 |
| GB | 2375744 A | 11/2002 |
| JP | 03266783 A | 11/1991 |
| JP | 06179314 A | 6/1994 |
| JP | 07089312 A | 4/1995 |
| JP | 07186650 A | 7/1995 |
| JP | 2000177346 A | 6/2000 |
| JP | 2005225258 A | 8/2005 |
| JP | 04297312 B2 | 7/2009 |
| WO | WO-9843840 A1 | 10/1998 |
| WO | 00/35687 A1 | 6/2000 |
| WO | WO-2007113761 A2 | 10/2007 |

* cited by examiner

SUSPENSION APPARATUS FOR VEHICLE

CROSS-REFERENCE TO RELATED APPLICATIONS

This application is the U.S. national phase of PCT/JP2008/052598 filed Feb. 8, 2008, which claims priority of Japanese Patent Application No. 2007-035323 filed Feb. 15, 2007.

TECHNICAL FIELD

The present invention relates to a suspension apparatus for a vehicle, and particularly to the art of simplifying a construction of the suspension apparatus.

BACKGROUND ART

A suspension device for a vehicle is provided between a body, and a wheel, of the vehicle so that the body is supported by the wheel, the transmission of vibration of the wheel to the body is minimized, and the position of the wheel relative to the body is bound as desired. There have conventionally been used various sorts of suspension devices. However, each suspension device cannot avoid having a complicated construction, because the suspension device is essentially required to achieve the above-indicated aims. Hence, the simplification of construction of the suspension device has been proposed by each of the following four patent documents: Japanese Patent Application Publication No. 2000-177346, Japanese Patent Application Publication No. 3-266783, Japanese Patent Application Publication No. 7-89312, and Japanese Patent Application Publication No. 2005-225258. For example, an elastic-deformation capability of a suspension link is so increased that the suspension link also functions as a spring member. Otherwise, a shape of a spring member is improved.

DISCLOSURE OF INVENTION

However, since the degree of simplification of the conventional suspension device is not satisfactory, the suspension device can be improved with respect to its various features.

It is therefore an object of the present invention is to provide a novel suspension apparatus for a vehicle that not only meets various requirements but also enjoys a simple construction.

Hereinafter, some examples of various modes of the present invention that are recognized as being claimable in the present application (hereinafter, referred to as the claimable modes, where appropriate) will be described and explained. The claimable modes include at least respective modes corresponding to the appended claims, but may additionally include broader or narrower modes of the present invention or even one or more different inventions than the claimed inventions. Each of the following modes (1) through (35) is numbered like claims, and depends from the other mode or modes, where appropriate, so as to help understand the claimable modes and to indicate and clarify possible combinations of elements or technical features thereof. It is, however, to be understood that the present invention is not limited to the elements or technical features of the following modes, or the combinations thereof, that will be described below for illustrative purposes only. It is to be further understood that each of the following modes should be construed in view of not only the explanations directly associated therewith but also the detailed description of the best mode of the invention, and that in additional claimable modes, one or more elements or one or more technical features may be added to, or deleted from, any of the following specific modes.

The above object is achieved according to each of the following modes (1) through (35) in which the mode (1) corresponds to claim 1; the mode (5) corresponds to claim 2; the mode (7) corresponds to claim 3; the mode (15) corresponds to claim 4; the mode (16) corresponds to claim 5; the mode (19) corresponds to claim 6; the mode (21) corresponds to claim 7; the mode (22) corresponds to claim 8; the mode (23) corresponds to claim 9; the mode (24) corresponds to claim 10; the mode (25) corresponds to claim 11; and the mode (26) corresponds to claim 12.

(1) A suspension apparatus for a vehicle having a body and a wheel, comprising, as a main element thereof, a main suspension member functioning as both a suspension spring and a suspension link, and including (a) a main portion which is formed of an elongate material such that opposite ends of the main portion are near to each other, (b) a first body-side attachment portion and a second body-side attachment portion which are provided at the opposite ends of the main portion, respectively, and which are attached to the body of the vehicle such that the first body-side attachment portion and the second body-side attachment portion are pivotable about a first pivotal axis and a second pivotal axis, respectively, each relative to the body, and (c) a wheel-side attachment portion which is provided at a portion of the main portion that is distant from the first and second body-side attachment portions, and which is attached to a wheel-side member that is provided on a side of the wheel, wherein respective positions of the first and second pivotal axes relative to each other are selected such that when the first and second body-side attachment portions are pivoted about the first and second pivotal axes, respectively, the main portion is elastically deformed.

In the suspension apparatus in accordance with the present invention, the main suspension member includes the main portion which is formed of the elongate material such that the opposite ends of the main portion are near to each other. Owing to this feature, the elongate material constituting the main portion can be long enough to have a sufficiently high elastic-deformation capability, but nonetheless the main portion as a whole can be provided in a considerably small space. In addition, the first and second body-side attachment portions that are respectively provided at the opposite ends of the main portion are attached to the body of the vehicle such that the first and second attachment portions are respectively pivotable about the first and second pivotal axes, each relative to the body of the vehicle. Generally, to attach something to the vehicle's body such that it is pivotable is easier than to fix it to the body such that it is not pivotable. To this end, it is possible to use a sliding bearing or a rolling bearing. Alternatively, it is possible to use a rubber bushing that has widely been used in conventional vehicle's suspension devices. Owing to the use of the rubber bushing, the transmission of vibration from the main suspension member to the body can be effectively prevented.

It is preferred to form the main portion of the single elongate material such that the main portion is smoothly curved to have, e.g., a generally C-shaped profile, because the concentration of stresses produced therein can be avoided and the manufacturing thereof can be facilitated. However, this is not essentially required. For example, the main portion may have a generally polygonal profile, or may be constituted by a plurality of members that are integrally combined to each other by utilizing welding, fastening with rivets, or fastening with bolts.

The elongate material may be a metallic material such as a spring material, or a non-metallic material such as a fiber-reinforced resin.

(2) The suspension apparatus according to the mode (1), wherein the first and second pivotal axes are parallel to each other, and are offset from each other in a direction perpendicular to the first and second pivotal axes.

In the present mode, the first and second pivotal axes are parallel to each other. Thus, it appears that the main suspension member can be freely pivotable. In fact, however, the first and second pivotal axes are offset from each other in the direction perpendicular thereto. Therefore, the main suspension member cannot be pivoted without causing elastic deformation of the main portion. This can be easily understood because if one of the two body-side attachment portions is freely movable and the main suspension member is pivoted about the pivotal axis of the other body-side attachment portion, then the pivotal axis of the one body-side attachment portion is moved in a direction perpendicular thereto. However, since the movement of the pivotal axis of the one body-side attachment portion is not allowed, the main portion must be elastically deformed so that the pivotal axis of the one body-side attachment portion may remain at its initial position.

(3) The suspension apparatus according to the mode (2), wherein the first and second pivotal axes are offset from each other in a direction having a directional component parallel to an upward-downward direction of the body of the vehicle.

(4) The suspension apparatus according to the mode (2) or the mode (3), wherein the first and second pivotal axes are offset from each other in a direction having a directional component parallel to a front-rear direction of the body of the vehicle.

(5) The suspension apparatus according to any of the modes (2) through (4), wherein the first and second body-side attachment portions are offset from each other in a direction having a directional component perpendicular to one of the first and second pivotal axes.

The smaller the amount of offsetting of the first and second pivotal axes from each other in the direction perpendicular thereto is, the easier the elastic deformation of the main suspension member is. That is, the ratio of (a) a distance between (a1) the two pivotal axes and (a2) the wheel-side attachment portion (strictly, a position where a force is exerted from the wheel to the wheel-side attachment portion) to (b) a distance between the two pivotal axes is great, and accordingly the main suspension member can be largely elastically deformed by a small, upward-directed force that is exerted thereto from the wheel. In other words, a so-call wheel rate is lowered.

On the other hand, each of the first and second body-side attachment portions needs to have a certain size so as to have a certain degree of strength. Thus, the distance between the two body-side attachment portions cannot be decreased beyond a certain amount so as to avoid the interference of the two attachment portions with each other. In contrast, in the present mode, the first and second body-side attachment portions are offset from each other in the direction having the directional component parallel to the first and second pivotal axes, so as to avoid the interference of the two attachment portions with each other. Therefore, the distance between the two body-side attachment portions in the direction perpendicular to the first and second pivotal axes can be decreased to a sufficiently small value. This is one of the advantages provided by the present mode.

(6) The suspension apparatus according to the mode (1), wherein the first and second pivotal axes are inclined relative to each other.

Since the first and second pivotal axes are inclined relative to each other, the main portion is subjected to a twisting elastic deformation, when the first and second body-side attachment portions are pivoted. For example, as will be described in connection with the mode (19), if respective pivotal centers of the first and second body-side attachment portions (i.e., respective intersection points where the first and second pivotal axes intersect two extension lines extended from opposite ends of a neutral axis of the main portion, respectively) are not offset from each other, the main portion is mainly subjected to a twisting elastic deformation (though the main portion is also subjected to a bending elastic deformation to some extent). On the other hand, as will be described in connection with the mode (15), if the first and second pivotal axes are inclined relative to each other and simultaneously the respective pivotal centers of the first and second body-side attachment portions are offset from each other, the main portion is apparently subjected to a complicated elastic deformation including the twisting and bending elastic deformations. That is, the elastic-deformation capability of the main portion can be more efficiently utilized. In addition, the twisting elastic deformation of the main portion can be effectively utilized to obtain desired changes of the alignment of the wheel.

In the case where the first and second pivotal axes are parallel to each other, it can be easily understood that the first and second body-side attachment portions are pivoted about the first and second pivotal axes, respectively. On the other hand, in the case where the first and second pivotal axes are inclined relative to each other, it cannot be easily understood how the first and second body-side attachment portions are pivoted. Hence, a first and a second intersection point where the first and second pivotal axes intersect the two extension lines extended from the opposite ends of the neutral axis of the main portion, respectively, are regarded as the respective pivotal centers of the first and second body-side attachment portions. That is, it can be said that the main suspension member is pivoted about a single straight line that passes through the first and second intersection points.

In many cases, a relative-positional relationship between the first and second body-side attachment portions and the main portion is pre-determined such that the first and second pivotal axes intersect the two extension lines extended from the neutral axis of the main portion, respectively. However, there are some cases where it cannot be strictly said that the first and second pivotal axes intersect the two extension lines, respectively. However, even in the latter cases, each of the first and second pivotal axes crosses, in a three-dimensional space, over a corresponding one of the two extension lines, with a short distance left therebetween. In those cases, a point on each pivotal axis that is the nearest to the corresponding extension line of the neutral axis can be regarded as an intersection point.

(7) The suspension apparatus according to the mode (6), wherein, in a plan view, the first and second pivotal axes are inclined relative to each other.

As will be described in connection with the mode (11), the first and second pivotal axes may be inclined relative to each other, in a view taken in a front-rear direction of the vehicle's body. However, if the first and second pivotal axes are inclined relative to each other in a plan view, more advantageous changes of the alignment of the wheel can be realized by the suspension apparatus.

(8) The suspension apparatus according to the mode (6) or the mode (7), wherein one of the first and second pivotal axes about which one of the first and second body-side attachment portions is pivotable is parallel to a lateral direction of the body of the vehicle.

(9) The suspension apparatus according to the mode (8), wherein an other of the first and second body-side attachment portions is provided at a position higher than a position where said one of the first and second body-side attachment portions is provided.

(10) The suspension apparatus according to the mode (8), wherein an other of the first and second body-side attachment portions is provided at a position lower than a position where said one of the first and second body-side attachment portions is provided.

(11) The suspension apparatus according to any of the modes (6) through (10), wherein, in a view taken in a front-rear direction of the body of the vehicle, the first and second pivotal axes are inclined relative to each other.

(12) The suspension apparatus according to any of the modes (7) through (11), wherein a first intersection point and a second intersection point where the first and second pivotal axes respectively intersect two extension lines which are respectively extended from opposite ends of a neutral axis of the main portion, are offset from each other in a direction having a directional component parallel to an upward-downward direction of the body of the vehicle.

(13) The suspension apparatus according to any of the modes (7) through (12), wherein a first intersection point and a second intersection point where the first and second pivotal axes respectively intersect two extension lines which are respectively extended from opposite ends of a neutral axis of the main portion, are offset from each other in a direction having a directional component parallel to a front-rear direction of the body of the vehicle.

(14) The suspension apparatus according to any of the modes (7) through (13), wherein a first intersection point and a second intersection point where the first and second pivotal axes respectively intersect two extension lines which are respectively extended from opposite ends of a neutral axis of the main portion, are offset from each other in a direction having a directional component parallel to a lateral direction of the body of the vehicle.

(15) The suspension apparatus according to any of the modes (6) through (14), wherein a first intersection point and a second intersection point where the first and second pivotal axes respectively intersect two extension lines which are respectively extended from opposite ends of a neutral axis of the main portion, are offset from an extension line extended from the second pivotal axis, and an extension line extended from the first pivotal axis, respectively.

(16) The suspension apparatus according to any of the modes (1) through (15), wherein a first reference plane as a vertical plane which passes through (a) a middle point between a first intersection point and a second intersection point where the first and second pivotal axes respectively intersect two extension lines which are respectively extended from opposite ends of a neutral axis of the main portion, and (b) a point on the neutral axis that is, in a plan view, most distant from the middle point, is inclined relative to a front-rear direction of the body of the vehicle.

In short, the present mode relates to an embodiment wherein the main suspension member, in particular, the main portion thereof is inclined, in its plan view, relative to a front-rear direction of the vehicle's body.

According to this mode, the main portion can be elastically deformed by not only the upward-downward-direction (or vertical-direction) force and the lateral-direction force that are exerted in the upward-downward and lateral directions of the vehicle's body, but also the front-rear-direction force that is exerted in the front-rear direction of the body. Therefore, desired changes of the alignment of the wheel, e.g., both the toe-in based on the front-rear-direction force and the toe-in based on the lateral-direction force can be obtained.

As far as the present specification is concerned, it is assumed that the vehicle is present on a horizontal plane, i.e., takes a horizontal posture, and accordingly the front-rear and lateral directions of the vehicle's body are horizontal and the upward-downward direction of the body is vertical.

It is also noted that the suspension apparatus in accordance with the present mode may be modified such that the feature "front-rear direction" employed in each of the modes (4), (11) and (13) is replaced with the feature—direction parallel to an intersection line where the first reference plane and a horizontal plane intersect each other—; and the feature "lateral direction" employed in each of the modes (8) through (10) and (14) is replaced with the feature—direction perpendicular to the first reference plane—

(17) The suspension apparatus according to any of the modes (1) through (16), wherein a straight line which passes through a middle point between a first intersection point and a second intersection point where the first and second pivotal axes respectively intersect two extension lines respectively extended from opposite ends of a neutral axis of the main portion, and which extends in a direction as an average of respective directions in which the first and second pivotal axes extend, is inclined, in a plan view, relative to a lateral direction of the body of the vehicle.

In short, the present mode relates to an embodiment wherein a pivotal plane on which the main suspension member is pivoted is inclined, in its plan view, relative to a front-rear direction of the vehicle's body. Generally, the main suspension member is pivoted about one or more attachment portions where the main member is attached to the vehicle's body, and a pivotal plane (strictly, a virtual pivotal plane) on which the main member is pivoted is inclined, in its plan view, relative to the front-rear direction of the vehicle's body. In the case where the first and second pivotal axes are parallel to each other, it is reasonable to think that the main suspension member is pivoted about a straight line that is parallel to those pivotal axes and passes through a middle point between the first and second intersection points; and in the case where the first and second pivotal axes are inclined relative to each other, it is reasonable to think that the main suspension member is pivoted about a straight line (hereinafter, simply referred to as the "virtual pivotal axis") that passes through the middle point between the first and second intersection points and extends in a direction as an average of respective directions in which the first and second pivotal axes extend. The average of respective directions in which the first and second pivotal axes extend may be defined as a direction of extension of a straight line having two directional components one of which is equal to an angle relative to the lateral direction of the vehicle' body, of a bisector of an angle contained by the first and second pivotal axes in a view taken in the upward-downward direction (or a view taken in the vertical direction), and the other of which is equal to an angle relative to the lateral direction of a bisector of an angle contained by the first and second pivotal axes in a view taken in the front-rear direction.

The suspension apparatus in accordance with the present mode may be modified such that the feature "lateral direction" employed in each of the modes (8) through (10) and (14)

is replaced with the feature—direction as an average of respective directions in which the first and second pivotal axes extend—.

(18) The suspension apparatus according to any of the modes (1), (2), (4) through (6), (9) through (11), (13), and (15), wherein a second reference plane as a plane which passes through (a) a middle point between a first intersection point and a second intersection point where the first and second pivotal axes respectively intersect two extension lines which are respectively extended from opposite ends of a neutral axis of the main portion, (b) a highest point on the neutral axis, and (c) a lowest point on the neutral axis, is inclined relative to a vertical direction.

In short, the present mode relates to an embodiment wherein the main suspension member is inclined, in the view taken in the front-rear direction of the vehicle's body, relative to the upward-downward direction of the body.

The suspension apparatus in accordance with the present mode may be modified such that the feature "upward-downward direction" employed in each of the modes (3) and (12) is replaced with the feature—direction parallel to the second reference plane and perpendicular to the front-rear direction—; the feature "plan view" employed in the mode (7) is replaced with the feature—view taken in a direction parallel to the second reference plane and perpendicular to the front-rear direction—; and the feature "lateral direction" employed in each of the modes (8) and (14) is replaced with the feature—direction perpendicular to the second reference plane—.

(19) The suspension apparatus according to any of the modes (1) through (18), wherein a straight line which passes through a middle point between a first intersection point and a second intersection point where the first and second pivotal axes respectively intersect two extension lines respectively extended from opposite ends of a neutral axis of the main portion, and which extends in a direction as an average of respective directions in which the first and second pivotal axes extend, is inclined, in a view taken in a front-rear direction of the body of the vehicle, relative to a lateral direction of the body of the vehicle.

In short, the present mode relates to an embodiment wherein a pivotal plane of the main suspension member is inclined, in the view taken in the front-rear direction of the vehicle's body, relative to the upward-downward direction of the body. For the same reason explained above with respect to the mode (17), "the straight line (i.e., the virtual pivotal axis) which passes through the middle point between the first and second intersection points and which extends in the direction as the average of respective directions of extension of the first and second pivotal axes" is used to define the feature of the present mode such that this straight line is inclined, in the view taken in the front-rear direction of the vehicle's body, relative to the lateral direction of the body. If an angle of inclination of the virtual pivotal axis relative to the lateral direction of the body in the front-rear-direction view is adjusted, for example, in which direction the main suspension member receives an external force exerted thereto, that is, what distribution of rigidity the main suspension member has for the purpose of receiving the external force can be adjusted, as will be described in BEST MODE FOR CARRYING OUT INVENTION. In addition, the present mode can enjoy such advantages that the main suspension member can be easily provided in an inner space of the wheel and that a drive device and/or a brake device can be easily provided in the vicinity of the main suspension member.

The suspension apparatus in accordance with the present mode may be modified such that the feature "upward-downward direction" employed in each of the modes (3) and (12) is replaced with the feature—direction perpendicular to the straight line (i.e., the virtual pivotal axis) which passes through the middle point between the first and second intersection points and which extends in the direction as the average of respective directions of extension of the first and second pivotal axes, and perpendicular to the front-rear direction of the vehicle's body—; the feature "plan view" employed in the mode (7) is replaced with the feature—view taken in a direction perpendicular to the straight line (i.e., the virtual pivotal axis) which passes through the middle point between the first and second intersection points and which extends in the direction as the average of respective directions of extension of the first and second pivotal axes, and perpendicular to the front-rear direction of the vehicle's body—; and the feature "lateral direction" employed in each of the modes (8) and (14) is replaced with the feature—direction as the average of respective directions of extension of the first and second pivotal axes—.

(20) The suspension apparatus according to the mode (2), wherein a plane (i.e., a virtual pivotal plane) which perpendicularly intersects a straight line that passes through a middle point between a first intersection point and a second intersection point where the first and second pivotal axes respectively intersect two extension lines respectively extended from opposite ends of a neutral axis of the main portion, and that extends in a direction as an average of respective directions in which the first and second pivotal axes extend, is inclined relative to both a front-rear direction and an upward-downward direction of the body of the vehicle.

In short, the present mode relates to an embodiment wherein a pivotal plane of the main suspension member is inclined, in its plan view, relative to the front-rear direction of the vehicle's body, and is also inclined, in the front-rear-direction view, relative to the upward-downward direction of the body.

(21) The suspension apparatus according to the mode (1), wherein the first and second pivotal axes are inclined relative to each other on a common plane, and an intersection point where one of the first and second pivotal axes intersects an extension line extended from one end of a neutral axis of the main portion, is located on an extension line extended from an other of the first and second pivotal axes.

(22) The suspension apparatus according to any of the modes (1) through (21), wherein the wheel-side attachment portion is fixed to a specific portion of the main portion that is most distant from the first and second body-side attachment portions in a front-rear direction of the body of the vehicle, is extended from said specific portion toward the first and second body-side attachment portions, and receives, at an extended end portion thereof, a lateral force exerted thereto from the wheel.

In the present mode, when a lateral-direction force acts on the wheel attached to the wheel-side attachment portion, a line of action of the lateral-direction force passes, in a plan view, through a position between (a) the first and second body-side attachment portions and (b) a most distant portion of the main portion that is the most distant from the two attachment portions in the front-rear direction of the vehicle's body. Therefore, the main portion of the main suspension member is subjected to a bending elastic deformation based on the lateral-direction force, and a twisting elastic deformation based on a twisting moment corresponding to a distance between (c) the position where the wheel-side attachment portion is fixed to the main portion and (d) the end portion of the wheel-side attachment portion. Therefore, as will be described in BEST MODE FOR CARRYING OUT INVENTION, the change of the toe angle based on the lateral-direction force can be adjusted by selecting a relative-positional relationship between (e) an input point where the lateral-direction force is inputted to the main suspension member and (f) an elastic main axis of the main suspension member with respect to the lateral-direction force.

(23) The suspension apparatus according to any of the modes (6) through (15) and (22), or respective portions of the modes (16) through (18) that depend from any of the modes (6) through (15), wherein the first and second body-side attachment portions are attached to the body of the vehicle such that one of the first and second body-side attachment portions is more easily movable relative to the body than an other of the first and second body-side attachment portions, in a direction parallel to a corresponding one of the first and second pivotal axes.

In the case where one of the first and second body-side attachment portions is movable relative to the vehicle's body in a direction parallel to a corresponding one of the first and second pivotal axes, a twisting elastic deformation of the main portion can easily occur due to the inclination of the first and second pivotal axes relative to each other, or due to the twisting torque or moment caused by the lateral-direction force described with respect to the mode (22). Therefore, desired changes of the alignment of the wheel can be easily obtained by utilizing the twisting elastic deformation of the main portion. In addition, since the other of the first and second body-side attachment portions is less movable relative to the vehicle's body in a direction parallel to the other pivotal axis, than the above-described one body-side attachment portion, the main suspension member as a whole is effectively restrained from being moved in the direction parallel to the first or second pivotal axis. Thus, the present suspension apparatus satisfies a requirement to bind the wheel, i.e., keep the posture of the wheel.

A typical example of the present mode is such that one of the first and second body-side attachment portions is freely movable in a direction parallel to a corresponding one of the first and second pivotal axes and the other body-side attachment portions is not movable in a direction parallel to the other pivotal axis. Otherwise, the present mode may be such that the first and second body-side attachment portions are both movable in respective directions parallel to the first and second pivotal axes, respectively. For example, the first and second body-side attachment portions are both attached to the vehicle's body via respective rubber bushings such that the two body-side attachment portions are pivotable about the first and second pivotal axes, respectively. In this case, both the first and second body-side attachment portions are more or less movable in the respective directions parallel to the first and second pivotal axes. Even in the latter case, one of the two rubber bushings may be one that can be deformed in its axial direction by only a small amount, and the other rubber bushing may be one that can be deformed in its axial direction by a large amount. In the last case, the suspension apparatus can enjoy the advantages of the present mode.

(24) The suspension apparatus according to any of the modes (1) through (23), further comprising two spring-holding portions a distance between which changes as the first and second body-side attachment portions are pivoted by an upward-downward-direction force exerted to the main suspension member from (a) the body of the vehicle and (b) the wheel to which the wheel-side attachment portion is attached via the wheel-side member; and an auxiliary spring member which is provided between the two spring-holding portions and which is elastically deformed as the distance between the two spring-holding portions changes.

If the auxiliary spring member is attached to, or detached from, the two spring-holding portions, or if an arbitrary one of a plurality of sorts of auxiliary spring members having different spring characteristics is selected and used, then the spring characteristic of the suspension apparatus as a whole can be easily changed.

The auxiliary spring member may be provided by any sort of spring. For example, in the case where the offsetting of the first and second pivotal axes from each other in the direction parallel thereto is zero or small, a coil spring may be employed as the auxiliary spring member; and in the case where the offsetting is large, a plate spring may be employed as the auxiliary spring member. Thus, depending upon the circumstances, an appropriate sort of spring may be employed as the auxiliary spring member.

(25) The suspension apparatus according to any of the modes (1) through (24), wherein at least a portion of the wheel-side attachment portion is provided in an inner space of the wheel to which the wheel-side attachment portion is attached via the wheel-side member.

The main suspension member can enjoy a small size. Therefore, a portion, or almost all portions, of the main suspension member can be accommodated by an inner space of the wheel that is suspended by the main suspension member. Preferably, a not less than 50% portion of the wheel-side attachment portion is provided in an inner space of the wheel; and more preferably, a not less than 80% portion of the wheel-side attachment portion is provided in the inner space.

(26) The suspension apparatus according to any of the modes (1) through (25), wherein at least a portion of at least one of the first and second body-side attachment portions is provided in an inner space of the wheel to which the wheel-side attachment portion is attached via the wheel-side member.

It is ideal that both the first and second body-side attachment portions are completely accommodated by the inner space of the wheel. However, if at least a portion of at least one of the first and second body-side attachment portions is provided in the inner space of the wheel, the suspension apparatus can enjoy an advantage. Preferably, a not less than 50% portion of at least one of the first and second body-side attachment portions is provided in the inner space of the wheel; and more preferably, a not less than 80% portion of at least one of the first and second body-side attachment portions is provided in the inner space.

(27) The suspension apparatus according to any of the modes (1) through (26), wherein a drive device which drives the wheel to which the wheel-side attachment portion is attached via the wheel-side member, is provided in an inner space of the wheel.

The present suspension apparatus can be constituted by the least number of parts and can enjoy a small size. Therefore, not only the main suspension member but also the drive device and/or a brake device can be provided in the inner space of the wheel.

(28) The suspension apparatus according to any of the modes (1) through (27), wherein a brake device which brakes the wheel to which the wheel-side attachment portion is attached via the wheel-side member, is provided in an inner space of the wheel.

(29) The suspension apparatus according to any of the modes (1) through (28), wherein the main portion of the main suspension member is formed of a hollow pipe as said elongate material.

(30) The suspension apparatus according to any of the modes (1) through (28), wherein the main portion of the main suspension member is formed of a solid bar as said elongate material.

(31) The suspension apparatus according to any of the modes (1) through (28), wherein the main portion of the main suspension member is formed of a band plate as said elongate material.

(32) The suspension apparatus according to any of the modes (1) through (31), further comprising a damping device which damps vibration of the main suspension member.

(33) The suspension apparatus according to the mode (32), wherein the damping device comprises a damping material which is provided along the main portion of the main suspension member and which damps the vibration when the main portion is elastically deformed.

The damping device may be constituted by a fluid-type shock absorber, according to the mode (35) described below. According to the present mode, however, the damping device is constituted by a damping material which is provided along the main portion of the main suspension member and which produces a damping force when the main portion is elastically deformed. In this case, the suspension apparatus as a whole can enjoy a still smaller size.

(34) The suspension apparatus according to the mode (33), wherein the damping material is distributed for each portion of the main portion of the main suspension member such that the damping material exhibits a damping effect proportional to an amount of elastic deformation of said each portion of the main portion.

According to this feature, though the damping material is provided along the main portion of the main suspension member, an elastic-deformation mode of the main portion (i.e., a manner of elastic deformation of the main portion, or a distribution of elastic strain of the main portion) is not changed, and accordingly the main suspension member or the suspension apparatus including the main suspension member can be easily designed.

(35) The suspension apparatus, wherein the damping device comprises a shock absorber having, as opposite end positions thereof, two connection portions which are connected to the wheel-side attachment portion of the main suspension member, and the body of the vehicle, respectively.

Alternatively, the shock absorber may be provided between an arbitrary portion of the main portion and the vehicle's body. In this case, however, the elastic-deformation mode of the main portion would be changed by the damping force produced by the shock absorber. In contrast, according to the present mode, the shock absorber are provided between the wheel-side attachment portion and the vehicle's body, and accordingly the elastic-deformation mode of the main portion is less influenced by the damping force produced by the shock absorber.

BEST MODE FOR CARRYING OUT THE INVENTION

Figure 1:
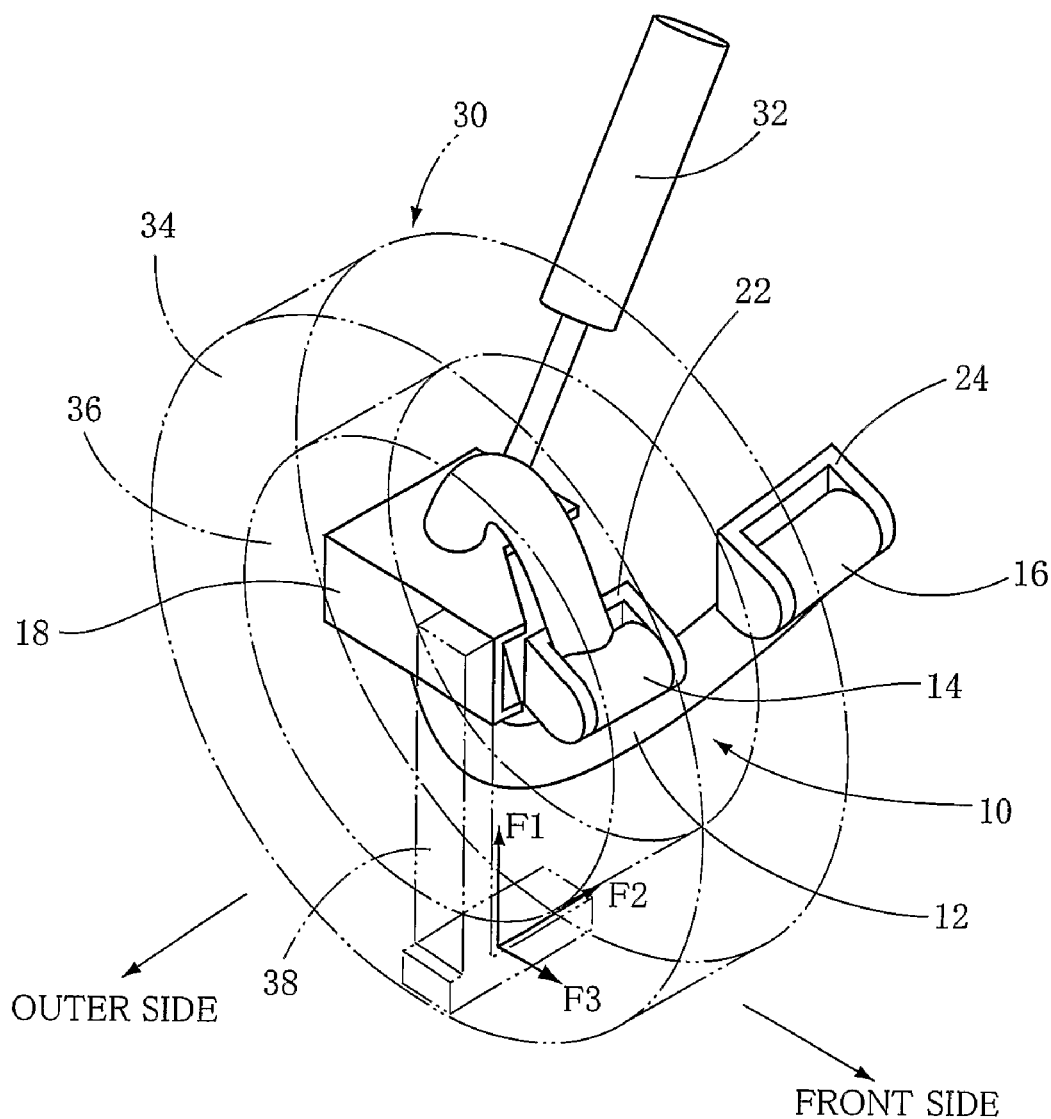
FIG. 1 is a perspective view of a suspension apparatus as an embodiment of the present invention.

FIG. 1 illustratively shows a rear-wheel suspension apparatus for a four-wheel automotive vehicle, to which the present invention is applied. More specifically explained, FIG. 1 is a view of a right-rear-wheel suspension apparatus, taken in an obliquely downward direction from a right-hand front side thereof. Hereinafter, the rear-wheel suspension apparatus will be referred to as just the suspension apparatus. The suspension apparatus includes, as a main constitutional element thereof, a main suspension member 10. The main suspension member 10 includes a main portion 12 constituted by an elongate pipe as an elongate material that is formed of a spring steel; a first and a second body-side attachment portion 14, 16 that are fixed to opposite ends of the main portion 12, respectively, and are each constituted by a hollow cylindrical material; and a wheel-side attachment portion 18 that is fixed to a portion of the main portion 12 that is the most distant from the body-side attachment portions 14, 16, more strictly, the most rear portion of the main portion 12 or the vicinity of the most rear portion.

The main portion 12 is so formed as to have such a shape that the opposite ends of the elongate pipe are made near to each other, i.e., have a generally C-shaped configuration as seen in a lateral direction thereof. Each of the two body-side attachment portions 14, 16 is fixed to a corresponding one of the opposite end portions of the main portion 12 such that the each attachment portion 14, 16 intersects the corresponding end portion at a right angle or an angle near the right angle. The two body-side attachment portions 14, 16 are attached to a body of the vehicle, more specifically described, two brackets 22, 24 each as a portion of the vehicle's body, such that the two body-side attachment portions 14, 16 are pivotable about respective pivotal axes.

Between each body-side attachment portion 14, 16 and the corresponding bracket 22, 24, there are provided a rubber bushing and an attachment axis member, each not shown. The rubber bushing includes an inner sleeve and an outer sleeve each of which is provided by a hollow cylindrical member, and additionally includes a rubber layer provided in a space present between the inner and outer sleeves. Owing to an elastic deformation of the rubber layer, transmission of vibration from each body-side attachment portion 14, 16 to the corresponding bracket 22, 24 can be effectively restrained. In addition, since the inner and outer sleeves can be rotated relative to each other, each body-side attachment portion 14, 16 can be pivoted relative to the corresponding bracket 22, 24. Thus, the main suspension member 10 is attached to the vehicle's body such that the two body-side attachment portions 14, 16 are pivotable about the respective pivotal axes thereof that coincide with respective centerlines thereof.

However, the rubber bushing may be replaced with a ball bearing or a slide bearing. In the latter case, it is preferred that an elastic member such as a rubber sheet be provided between each bracket 22, 24 and the vehicle's body so as to restrain the transmission of vibration.

The wheel-side attachment portion 18 is attached to a wheel holding member, not shown, that holds a wheel 30 such that the wheel 30 is rotatable. The main suspension member 10 defines a position of the wheel 30 relative to the vehicle's body, and allows, owing to an elastic deformation of the main portion 12 thereof, the wheel 30 to move relative to the body. A shock absorber 32 is provided between the wheel-side attachment portion 18 and the vehicle's body. Generally, a suspension device is required to have three main functions, i.e., a suspension-spring function, a suspension-link function, and a vibration damping function. The main suspension member 10 has the suspension-spring function, i.e., the function of causing the wheel 30 to support the vehicle's body while allowing the wheel 30 to move relative to the body in an upward-downward direction, and additionally has the suspension-link function, i.e., the function of defining the position of the wheel 30 relative to the vehicle's body. To this end, the main suspension member 10 is required to meet various conditions, i.e., have specific suspension characteristics, which will be described later.

A considerable portion of the present suspension apparatus is provided in an inner space of the wheel 30, i.e., a space surrounded by a wheel disc and a rim of a wheel frame 36 that holds a tire 34 of the wheel 30. More specifically described, an entirety of the main suspension member 10 is located inside an inner circumferential surface of the wheel frame 36 as seen in an axial direction of the wheel 30, i.e., a lateral direction of the vehicle's body. In addition, not less than 90% of the body-side attachment portion 14, not less than 80% of the wheel-side attachment portion 18, and not less than 50% of a neutral axis of the main portion 12 are located in the inner space of the wheel 30 as seen in a direction perpendicular to the axial direction of the wheel 30.

In FIG. 1, reference numeral 38 designates a wheel-substitute member as a virtual member that virtually substitutes the wheel 30 so as to take, into account, an upward-downward-direction force F1, a lateral-direction force F2 and a front-rear-direction force F3 that are exerted from the wheel 30 to the wheel-side attachment portion 18.

Important suspension characteristics the main suspension member 10 is required to have are as follows:

(a) The main suspension member 10 can allow an appropriate elastic displacement of the wheel-side attachment portion 18 in the upward-downward direction.

Figure 2:
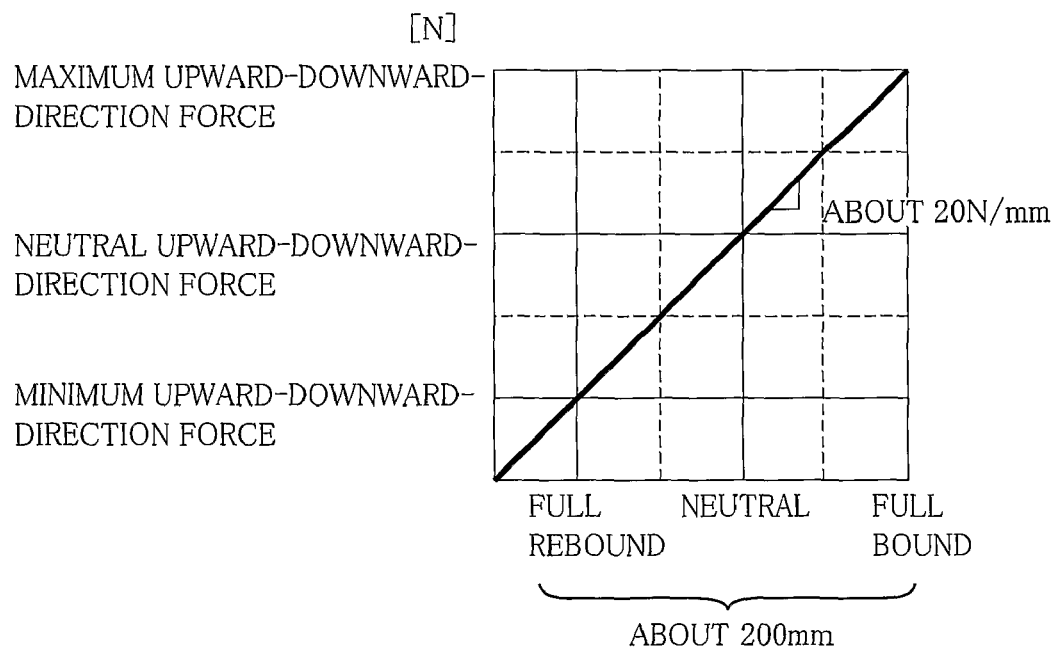
FIG. 2 is a graph showing one of various conditions that are desirable to be met by the suspension apparatus.

When the vehicle is running on a road surface and the wheel 30 is being moved upward and downward because of irregularities of the road surface, it is desirable that the vehicle's body be effectively prevented from being moved upward and downward with the movements of the wheel 30. To this end, it is desirable that the main suspension member 10 be one that has a sufficiently high elastic-deformation capability and exhibits an appropriate wheel rate. For example, as shown in FIG. 2, the main suspension member 10 preferably allows a stroke of about 100 mm in each of a bound direction and a rebound direction, and exhibits a wheel rate of about 20 N/mm.

(b) The main suspension member 10 can enjoy a small size.

Figure 3:
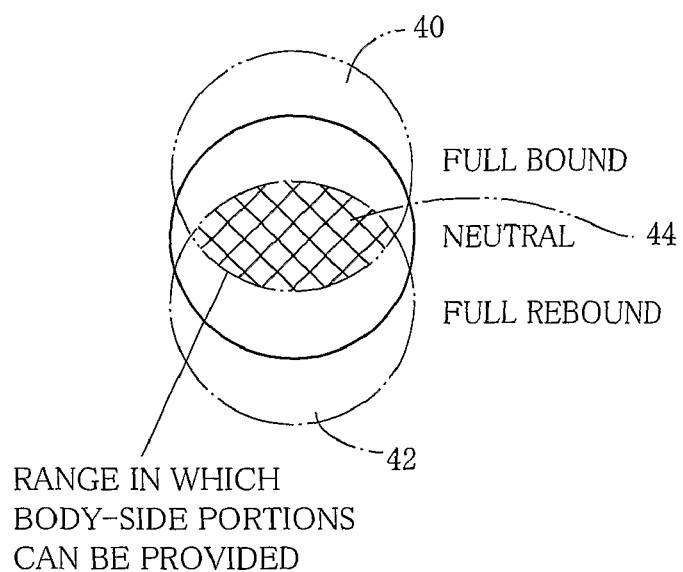
FIG. 3 is a view showing another condition that is desirable to be met by the suspension apparatus.

Preferably, a considerable portion of the main suspension member 10 is provided in the inner space of the wheel 30, for example, not less than 50% of at least one of the two body-side attachment portions 14, 16, and not less than 30% of the neutral axis of the main portion 12 are located in the inner space of the wheel 30. More specifically described, regarding the embodiment shown in FIG. 3, reference numeral 40 designates an inner space of the wheel 30 when the wheel 30 is fully bounded; reference numeral 42 designates an inner space of the wheel 30 when the wheel 30 is fully rebounded; and reference numeral 44 designates an overlapping portion of the full-bound inner space 40 and the full-rebound inner space 40, as seen in the lateral direction. In the embodiment shown in FIG. 3, preferably, the two body-side attachment portions 14, 16 of the main suspension member 10, or respective portions of the main portion 12 that are adjacent to the two attachment portions 14, 16 are located in the overlapping portion 44. However, an entirety of one of the two body-side attachment portions 14, 16 may be located outside the inner space of the wheel 30 as seen in the direction perpendicular to the axial direction of the wheel 30. In this case, the one body-side attachment portion 14, 16 need not meet the above-indicated condition.

(c) The main suspension member 10 can appropriately bind the wheel 30.

Figure 4:
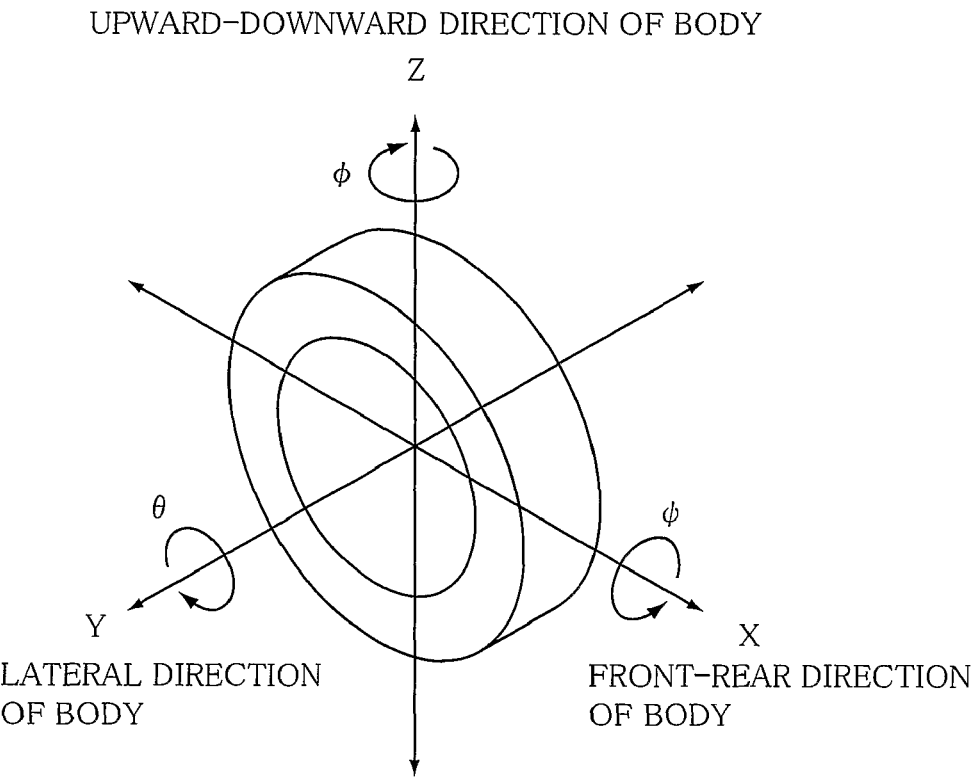
FIG. 4 is a view showing another condition that is desirable to be met by the suspension apparatus.

As shown in FIG. 4, the wheel 30 has six degrees of freedom with respect to three translations x, y, z and three rotations $\psi$, $\phi$, $\theta$. The main suspension member 10 needs to have appropriate rigidity and strength for each of the six degrees of freedom.

Figure 5:
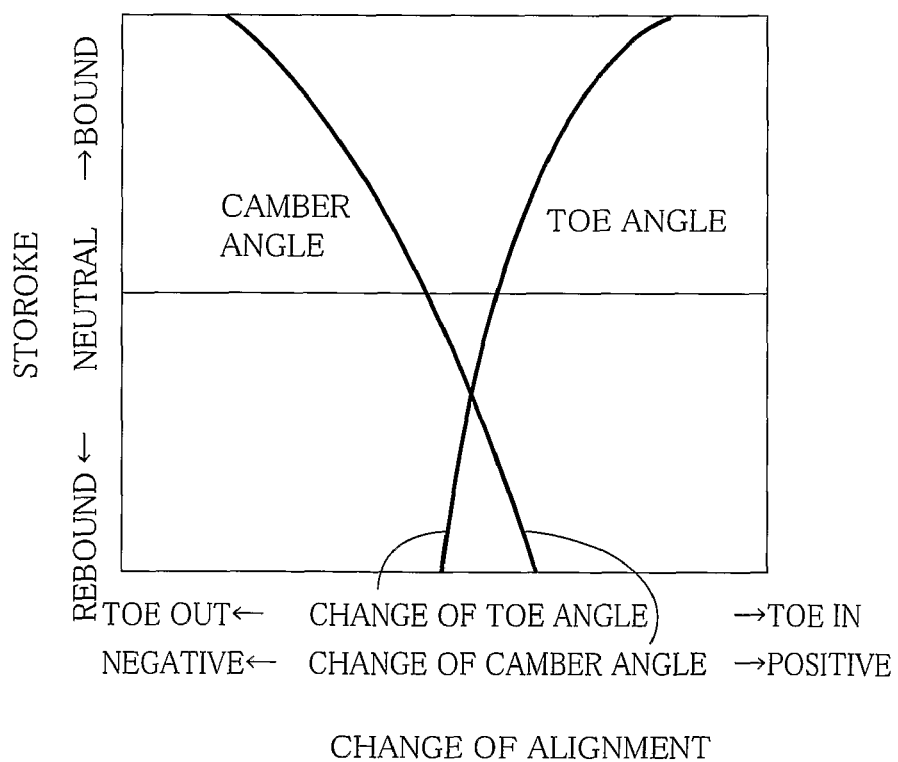
FIG. 5 is a view showing another condition that is desirable to be met by the suspension apparatus.

In addition, in response to a movement of the wheel 30 relative to the vehicle's body in the upward-downward direction, i.e., an upward-downward-direction stroke of the wheel 30, it is desirable that an appropriate change of alignment of the wheel 30 occur, for example, changes of a toe angle ($\phi$) and a camber angle ($\psi$) occur as shown in FIG. 5.

Moreover, when an external force such as a front-rear-direction force or a lateral-direction force is exerted from the road surface to the wheel 30, it is desirable that an appropriate change of the alignment occur. For example, when a lateral-direction force is exerted inward of the vehicle, it is desirable that the toe angle change inward, i.e., toe-in occur.

As described below, there are a plurality of concrete measures to meet the above-explained conditions. A suspension apparatus having desirable suspension characteristics can be obtained by employing one or more of those measures.

(i) Selection of a length of the neutral axis of the main portion 12.

(ii) Selection of a shape and a size of a transverse cross section of the main portion 12.

(iii) Offsetting of the two body-side attachment portions 14, 16 from each other in a direction perpendicular to the respective pivotal axes thereof such that the respective pivotal axes are kept parallel to each other.

(iv) Offsetting of the two body-side attachment portions 14, 16 from each other in a direction parallel to the respective pivotal axes thereof.

(v) Inclining of the respective pivotal axes of the two body-side attachment portions 14, 16 relative to each other.

(vi) Selection of a shape of the main suspension member 10.

(vii) Selection of a force-input position where a force is inputted from the wheel 30 to the wheel-side attachment portion 18.

(viii) Inclining of the main suspension member 10 relative to the front-rear direction of the vehicle's body.

(ix) Inclining of a virtual pivotal plane of the main suspension member 10 relative to the front-rear direction of the vehicle's body.

(x) Inclining of the main suspension member 10 relative to the upward-downward direction of the vehicle's body.

(xi) Inclining of a virtual pivotal plane of the main suspension member 10 relative to the upward-downward direction of the vehicle's body.

(i) Selection of the length of the neutral axis of the main portion 12.

Owing to at least a bending elastic deformation of the main portion 12 per se, or bending and twisting elastic deformations of the main portion 12 per se, the main portion 12 allows an upward-downward-direction stroke of the wheel 30. Thus, it is apparent that generally, as the length of the neutral axis of the main portion 12 increases, the elastic-deformation capability of the main portion 12 increases. To the contrary, the size of the suspension apparatus can be reduced by decreasing the length of the neutral axis. In view of these two aspects, the length of the neutral axis should be selected at an appropriate value.

(ii) Selection of the shape and size of the transverse cross section of the main portion 12.

Figure 6:
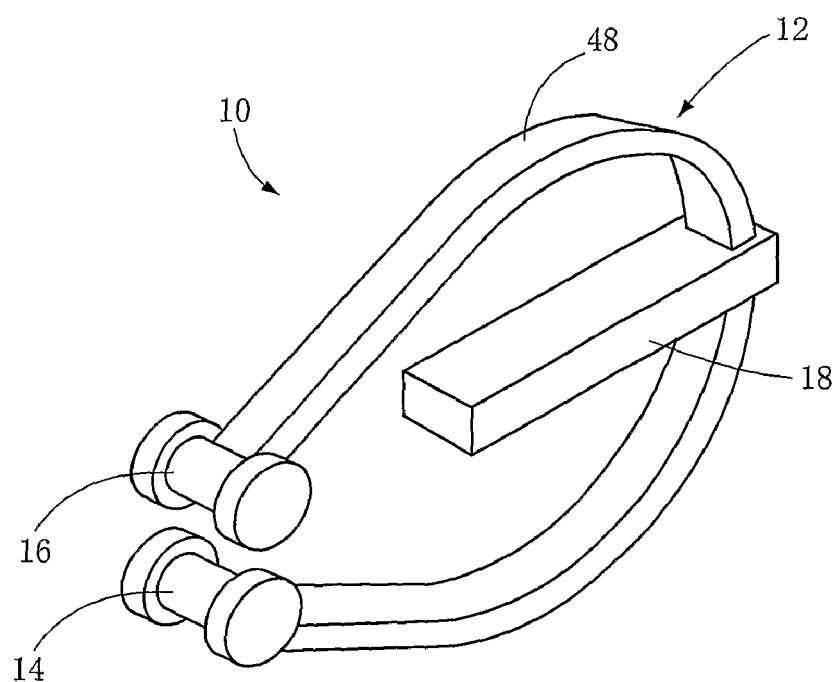
FIG. 6 is a perspective view of a main suspension member of another suspension apparatus as another embodiment of the present invention.

As described above, owing to at least the bending elastic deformation of the main portion 12 per se, or the bending and twisting elastic deformations of the main portion 12 per se, the main portion 12 allows the upward-downward-direction stroke of the wheel 30. Thus, the shape and size of the transverse cross section of the main portion 12 largely influence the elastic-deformation capability and a maximum stress thereof. In the present embodiment, the main portion 12 is formed of an elongate pipe having an annular transverse cross section that is suitable for both bending and twisting, and allows easy calculations of respective amounts of deformation and stress. However, the main portion 12 may be formed of a different elongate material having a different transverse cross section, e.g., a band plate 48 having a rectangular transverse cross section as shown in FIG. 6.

The main portion 12 may be one whose cross-sectional shape and size are constant over its lengthwise entirety. However, for the purpose of averaging the stress and/or decreasing the overall weight, it is possible to vary at least one of the cross-sectional shape and size of the main portion 12 along its neutral axis. In the latter case, it is possible to vary, stepwise or continuously, at least one of the cross-sectional shape and size.

(iii) Offsetting of the two body-side attachment portions 14, 16 from each other in the direction perpendicular to the respective pivotal axes thereof such that the respective pivotal axes are kept parallel to each other.

Figure 7:
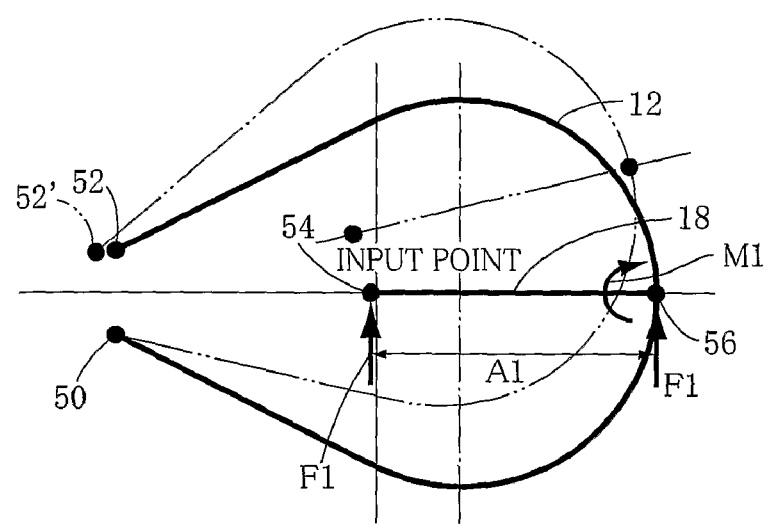
FIG. 7 is a view for explaining one measure to meet conditions that are required to be met by a main suspension member of the suspension apparatus of FIG. 1.

In the case where the two body-side attachment portions 14, 16 are coaxial with each other, the main suspension member 10 is just pivoted about the respective pivotal axes of the body-side attachment portions 14, 16, i.e., is not elastically deformed, when the upward-downward-direction force is exerted upward from the wheel 30 to the main suspension member 10. Thus, no elastic forces for the wheel 30 to support the vehicle's body are produced. In contrast, in the case where the respective pivotal axes of the body-side attachment portions 14, 16 are parallel to each other but are offset from each other in the direction perpendicular to the respective pivotal axes, the main suspension member 10 cannot be pivoted without causing an elastic deformation of the main portion 12, and accordingly an elastic force for the wheel 30 to support the vehicle's body is produced. This can be understood from FIG. 7 that conceptually shows the main suspension member 10 shown in FIG. 1. In FIG. 7, if the main suspension member 10 is pivoted about a point 50 representing the first body-side attachment portion 14, a point 52 representing the second body-side attachment portion 16 should be moved to a point 52' along an arc whose center rides on the point 50. However, in fact, the movement of the point 52 is not allowed, and accordingly it is needed to return the point 52' to the point 52. To this end, the main portion 12 is elastically deformed. In FIG. 7, the two points 50, 52, i.e., the respective positions of the respective pivotal axes of the two body-side attachment portions 14, 16 are offset from each other in the upward-downward direction of the vehicle's body. Likewise, in the case where the respective pivotal axes of the two body-side attachment portions 14, 16 are offset from each other in only the front-rear direction of the vehicle's body or in both the upward-downward direction and the front-rear direction, the pivotal movement of the main suspension member 10 involves the elastic deformation of the main portion 12. Thus, the elastic force for the wheel 30 to support the vehicle's body is produced.

In fact, however, the upward-downward-direction force F1 exerted from the wheel 30 to the main suspension member 10 is inputted to an input point 54 of the wheel-side attachment portion 18 and, because of a distance present between the input point 54 and an input point 56 of the main portion 12 (hereinafter, referred to as the "first arm length A1"), the input point 56 of the main portion 12 receives the upward-directed, upward-downward-direction force F1, and an angular moment M1 that is clockwise in FIG. 7 (i.e., a product of the upward-downward-direction force F1 and the first arm length A1). Therefore, the main portion 12 produces not only an elastic force to return the point 52' to the point 52 but also an elastic force based on the angular moment M1.

(iv) Offsetting of the two body-side attachment portions 14, 16 from each other in the direction parallel to the respective pivotal axes thereof.

As described above, in the case where the two body-side attachment portions 14, 16 are offset from each other in the direction perpendicular to the respective pivotal axes thereof such that the respective pivotal axes are kept parallel to each other, the two body-side attachment portions 14, 16 may interfere with each other, or one of the two body-side attachment portions 14, 16 may interfere with the main portion 12, if the amount of offsetting of the two attachment portions 14, 16 is too small. Thus, in this case, the two body-side attachment portions 14, 16 may not be offset from each other by a desirable amount. In contrast, in the case where the two body-side attachment portions 14, 16 are offset from each other in the direction parallel to the respective pivotal axes thereof, the above-described interference can be avoided, and the two attachment portions 14, 16 can be offset from each other by a desirable amount even if the desirable amount may be very small. The advantage that the interference of the two body-side attachment portions 14, 16 with each other or the interference of one of the two body-side attachment portions 14, 16 with the main portion 12 can be avoided, can be found in a case, described later, where the respective pivotal axes of the two body-side attachment portions 14, 16 are inclined relative to each other.

In addition, in the case where the two body-side attachment portions 14, 16 are offset from each other in the direction parallel to the respective pivotal axes thereof, if the lateral-direction force is exerted to the main suspension member 10, the main suspension member 10 can more easily resist an angular moment to pivot the suspension member 10, in its plan view, about the respective opposite ends thereof located on the side of the two body-side attachment portions 14, 16, as compared with the case where the two body-side attachment portions 14, 16 are not offset from each other in the direction parallel to the respective pivotal axes thereof. In a particular case where respective rubber bushings are provided between the two brackets 22, 24 and the two body-side attachment portions 14, 16, an amount of elastic deformation of each rubber bushing in its radial direction for the former case will be smaller, and an amount of pivotal motion of the main suspension member 10 in its plan view, caused by the elastic deformation of each rubber bushing in its radial direction for the former case, will be smaller each as compared with the latter case.

Moreover, in the case where the two body-side attachment portions 14, 16 are offset from each other in the direction parallel to the respective pivotal axes thereof, the shape of the main portion 12 can be selected from a wider range as compared with the case where the two body-side attachment portions 14, 16 are not offset from each other in the direction parallel to the respective pivotal axes thereof. This contributes to increasing the degree of freedom of designing of the present suspension apparatus.

(v) Inclining of the respective pivotal axes of the two body-side attachment portions 14, 16 relative to each other.

If, in place of, or in addition to, the offsetting of the respective pivotal axes of the two body-side attachment portions 14, 16 from each other in the direction perpendicular to those pivotal axes, the pivotal axes are inclined relative to each other, then the main portion 12 can be elastically deformed when the main suspension member 10 is pivoted.

Figure 8:
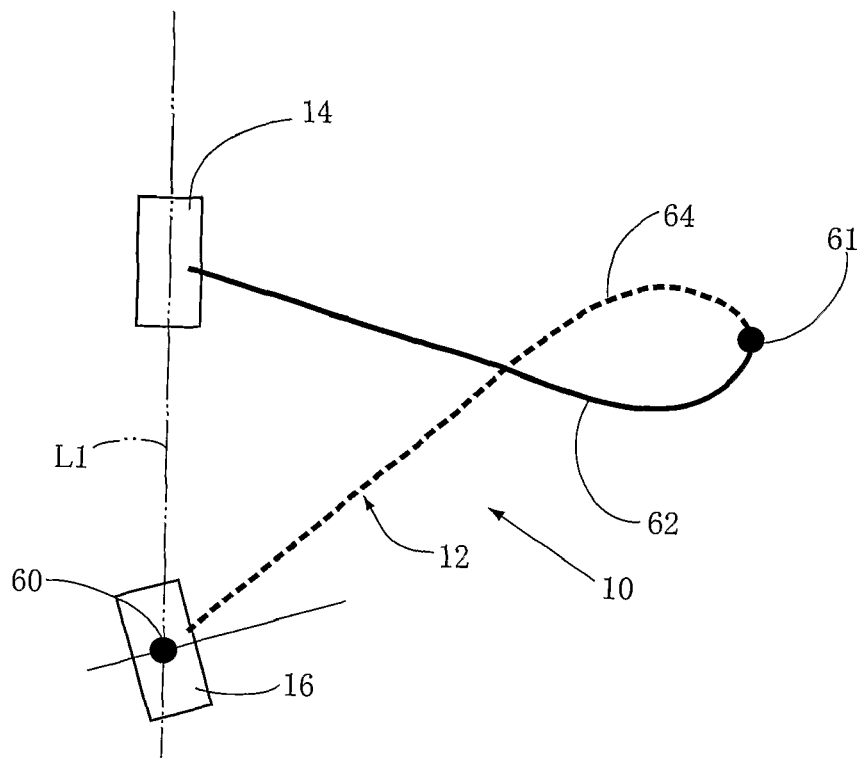
FIG. 8 is a view for explaining another measure to meet the conditions that are required to be met by the main suspension member of the suspension apparatus of FIG. 1.
Figure 9:
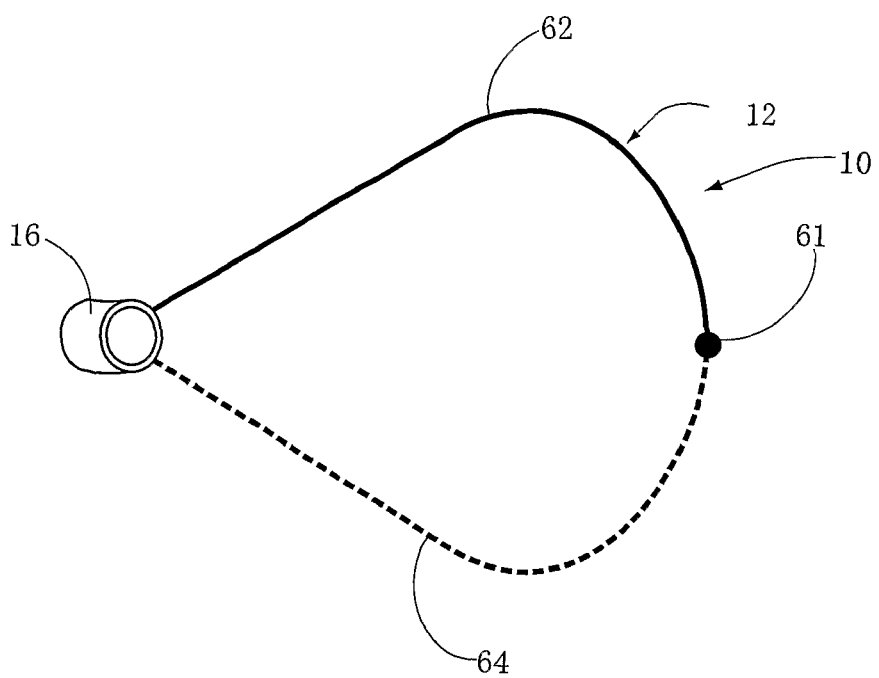
FIG. 9 is a side view of the main suspension member shown in FIG. 8.

For example, it is assumed that, as shown in FIGS. 8 and 9, from a state in which the respective pivotal axes of the two body-side attachment portions 14, 16 are coaxial with each other, the second body-side attachment portion 16 is pivoted, on a horizontal plane, by a predetermined angle about a middle point 60 of the pivotal axis thereof, and then the second body-side attachment portion 16 is fixed to the main portion 12. In FIGS. 8 and 9, reference numeral 61 designates a most rear point of the main portion 12; reference numeral 62 designates an upper portion of the main portion 12 that is located on an upper side of the most rear point 61; and reference numeral 64 designates a lower portion of the main portion 12 that is located on a lower side of the most rear point 61. The upper portion 62 is drawn by a solid line; and the lower portion 64 is drawn by a broken line. In addition, the middle point of the pivotal axis of each body-side attachment portion 14, 16 is defined as an intersection point where the pivotal axis intersects a middle plane of the each body-side attachment portion 14, 16 with respect to the axial direction thereof. Regarding the embodiment shown in FIGS. 8 and 9, the middle point coincides with an intersection point where the pivotal axis of each body-side attachment portion 14, 16 intersects the neutral axis of the main portion 12.

Figure 10:
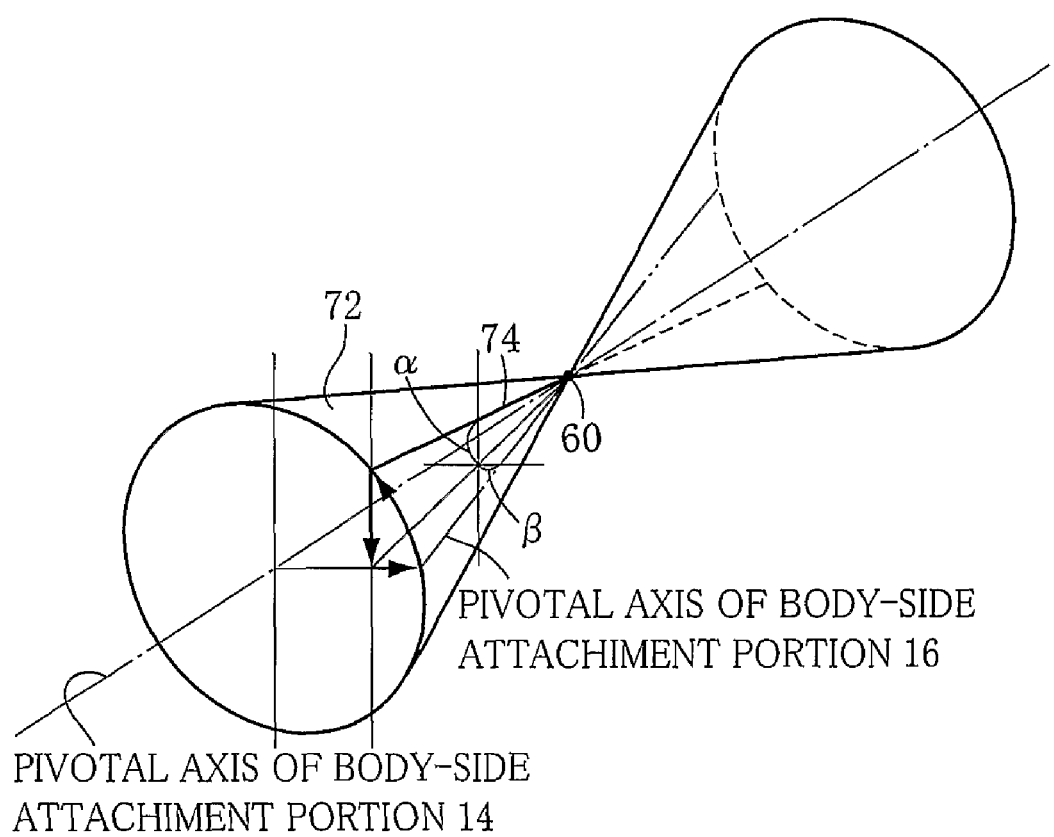
FIG. 10 is a view for explaining an operation of the main suspension member shown in FIG. 8.

Regarding the embodiment shown in FIGS. 8 and 9, even if it may be assumed that the main suspension member 10 is pivoted about a straight line, L1, constituting the pivotal axis of the first body-side attachment portion 14, the pivotal axis of the first body-side attachment portion 14 is not moved and the middle point 60 of the second body-side attachment portion 16 is not moved, either. However, the pivotal axis of the second body-side attachment portion 16 is revolved about the straight line L1. As shown in the enlarged view of FIG. 10, the pivotal axis of the second body-side attachment portion 16 constitutes a generator 74 of a conical surface 72. Therefore, in order to return the pivotal axis of the second body-side attachment portion 16 to its initial position, it is needed to rotate the generator 74 by an angle, $\alpha$, about the middle point 60 on a vertical plane and additionally rotate the generator 74 by an angle, $\beta$, about the middle point 60 on the horizontal plane. Owing to the rotation by the angle $\alpha$, the main portion 12 is mainly subjected to a twisting elastic deformation; and owing to the rotation by the angle $\beta$, the main portion 12 is mainly subjected to a bending elastic deformation. Since the angle $\alpha$ is greater than the angle $\beta$, the main portion 12 is mainly subjected to the twisting elastic deformation (and also to a bending elastic deformation caused by a twisting moment, as described later), and this elastic deformation produces an elastic force for the wheel 30 to support the vehicle's body.

If the respective pivotal axes of the two body-side attachment portions 14, 16 are inclined relative to each other, the middle point of the pivotal axis of one of the two attachment portions 14, 16 is offset from the pivotal axis of the other attachment portion 14, 16 and, in a particular case, the middle point of the pivotal axis of each one of the two attachment portions 14, 16 is offset from the pivotal axis of the other attachment portion 14, 16. For example, if, from a state in which the respective pivotal axes of the two body-side attachment portions 14, 16 coincide with a common straight line, the two pivotal axes are inclined from the common straight line in opposite directions by either a same angle or different angles, in such a manner that the respective middle points of the two pivotal axes remain located on the common straight line, the main portion 12 can produce, as the suspension member 10 is pivoted about the straight line, an elastic force for the wheel 30 to support elastically the vehicle's body. In this case, the respective middle points of the respective pivotal axes of the first and second attachment portions 14, 16 are offset from the respective pivotal axes of the second and first attachment portions 16, 14.

As described above, only if the respective pivotal axes of the two body-side attachment portions 14, 16 are inclined relative to each other, the main portion 12 can be elastically deformed as the suspension member 10 is pivoted. If, additionally, the middle point of the pivotal axis of the second body-side attachment portion 16 is offset from the pivotal axis of the first body-side attachment portion 14 in the direction perpendicular to the latter pivotal axis, the main portion 12 can be elastically deformed for the same reason as explained above with respect to Item (iii). Thus, in the latter case, the measures described at Item (v) and the measures described at Item (iii) are combined with each other.

(vi) Selection of the shape of the main suspension member 10.

As described previously, the elastic-deformation capability of the main suspension member 10 can be changed by selecting the length of the neutral axis of the main portion 12. In addition, a maximum value of the upward-downward-direction stroke of the wheel 30, a wheel rate of the wheel 30, or a change of alignment of the wheel 30 that corresponds to the upward-downward-direction stroke thereof can be adjusted as desired, by (A) selecting an appropriate shape of the main portion 12 [e.g., selecting a shape of curvature of the main portion 12 (in particular, a shape of curvature of the main portion 12 as a whole in its side view), or selecting respective proportions of respective lengths of respective neutral axes of (a) a first portion of the main portion 12 located between the first body-side attachment portion 14 and the wheel-side attachment portion 18 and (b) a second portion of the main portion 12 located between the second body-side attachment portion 16 and the wheel-side attachment portion 18], (B) selecting an angle of inclination of the pivotal axis of the second body-side attachment portion 16 relative to the pivotal axis of the first body-side attachment portion 14, or (C) selecting a shape of the wheel-side attachment portion 18 (in particular, the above-described arm length A1 thereof.

Figure 11:
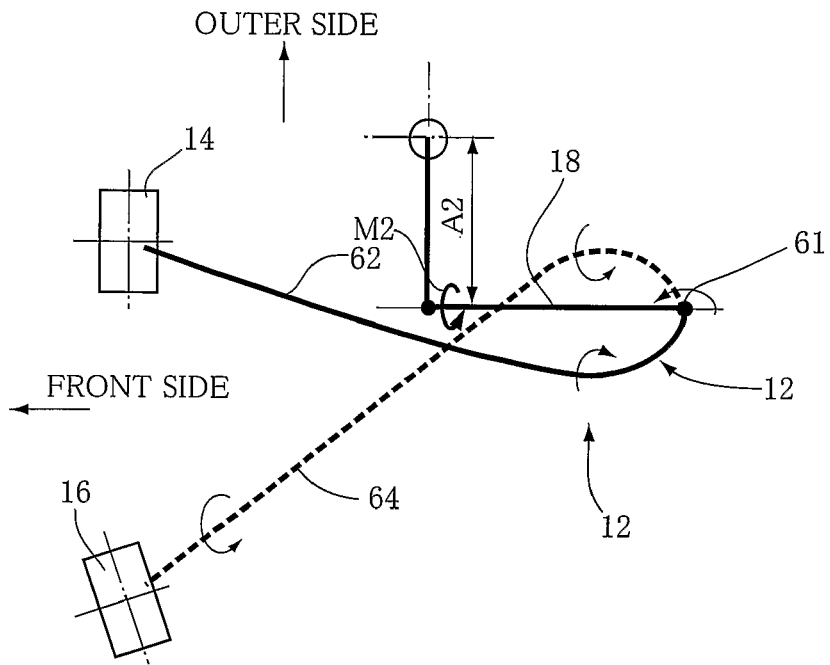
FIG. 11 is a plan view for explaining a change of alignment associated with the main suspension member shown in FIG. 8.
Figure 12:
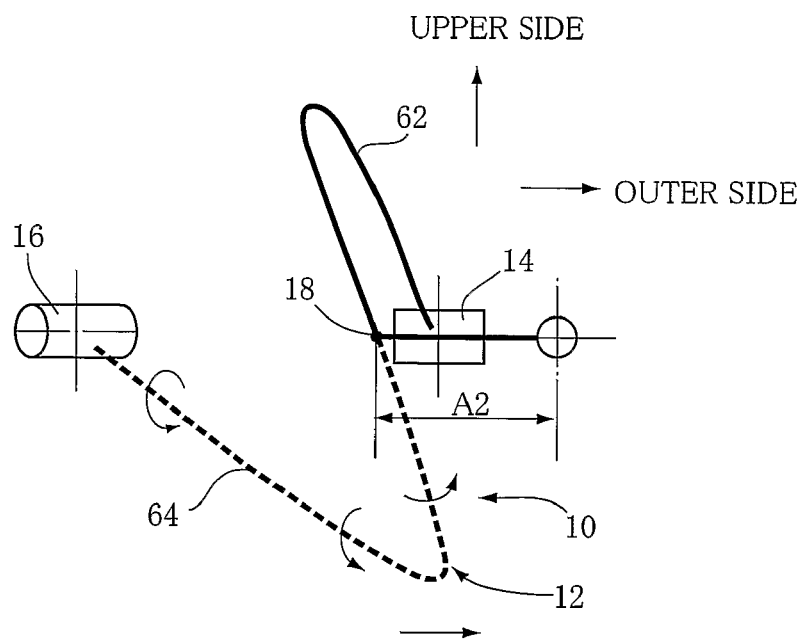
FIG. 12 is a rear view for explaining the change of alignment associated with the main suspension member shown in FIG. 8.

For example, the change of alignment of the wheel 30 can be adjusted by combining, with each other, the measures, described at Item (v), that the respective pivotal axes of the two body-side attachment portions 14, 16 are inclined relative to each other and the measures, described at Item (vi), that the shape of the main suspension member 10 is selected, in the following manner: In an embodiment shown in FIG. 11, the pivotal axis of the first body-side attachment portion 14 is parallel to the lateral direction of the vehicle's body, and the pivotal axis of the second body-side attachment portion 16 is inclined on a horizontal plane such that the pivotal axis goes frontward as it goes outward. Regarding this embodiment, when the wheel 30 is bounded, the end portion of the main portion 12 that is located on the side of the second body-side attachment portion 16 is twisted in a direction indicated by an arrow, as described above with respect to Item (v). Consequently, as shown in FIG. 12, the lower portion 64 of the main portion 12 is moved outward of the vehicle's body, whereas the upper portion 62 is not substantially moved outward, or is even moved inward. Thus, the wheel-side attachment portion 18 is moved counterclockwise in FIG. 12 (i.e., in its rear view). Therefore, the camber angle of the wheel 30 to which the wheel-side attachment portion 18 is attached is changed toward the negative side (FIG. 5). In addition, if the upward-directed, upward-downward-direction force F1 is exerted to the wheel 30 at a distance, A2, (hereinafter, referred to as the "second arm length A2") from the neutral axis of the main portion 12 in the outward direction of the vehicle's body, the wheel-side attachment portion 18 is moved counterclockwise in FIG. 12, owing to an angular moment M2 equal to the product of the second arm length A2 and the upward-downward-direction force F1. For this reason, too, the camber angle of the wheel 30 is changed toward the negative side. The first amount of change of the camber angle based on the twisting elastic deformation of the main portion 12 increases as the angle of inclination of the pivotal axis of the second body-side attachment portion 16 increases; and the second amount of change of the camber angle based on the angular moment M2 increases as the second arm length A2 increases. In addition, each of the first and second amounts increases as the upward-directed, upward-downward-direction force F1 exerted to the wheel 30 increases, i.e., as the upward-downward-direction stroke of the wheel 30 in the bound direction increases.

Next, the change of the toe angle is explained. As described above, based on the twisting elastic deformation of the main portion 12, a specific portion of the main portion 12 that is located in the vicinity of the most rear point 61 is moved counterclockwise in FIG. 11, and accordingly the wheel-side attachment portion 18 is also rotated counterclockwise. Consequently, the toe angle of the wheel 30 is changed toward the toe-in side (FIG. 5). The amount of change of the toe angle increases as the angle of inclination of the pivotal axis of the second body-side attachment portion 16 increases; and the amount of change of the toe angle increases as the upward-directed, upward-downward-direction force F1 exerted to the wheel 30 increases, i.e., as the upward-downward-direction stroke of the wheel 30 in the bound direction increases.

(vii) Selection of the input position where the force is inputted from the wheel 30 to the wheel-side attachment portion 18.

Figure 13:
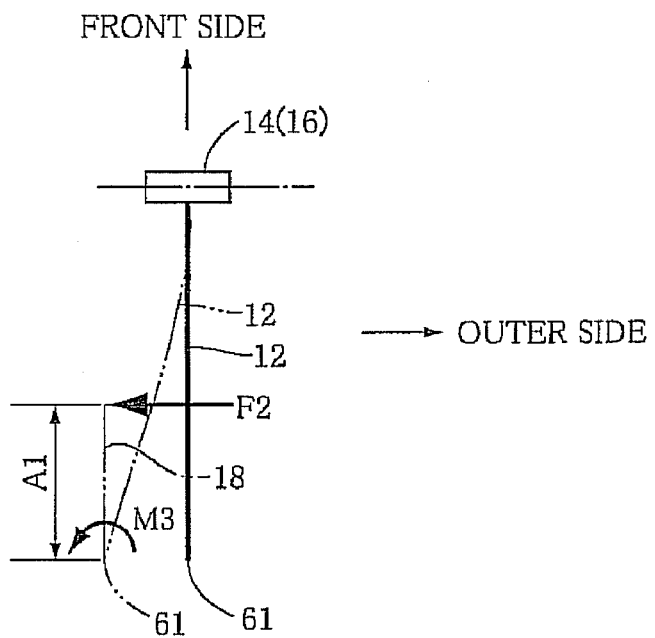
FIG. 13 is a plan view for explaining a deformation of a main suspension member of another suspension apparatus as another embodiment of the present invention when a lateral-direction force is exerted to the suspension apparatus.

As described above, the wheel-side attachment portion 18 is provided at the most distant portion (i.e., the most rear point 61 or its vicinity) of the main portion 12 from the two body-side attachment portions 14, 16. However, not only the shape of the wheel-side attachment portion 18 but also the input position where the force is inputted from the wheel 30 to the wheel-side attachment portion 18 can be largely changed. As described above, the magnitude of the angular moment M2 exerted to the main portion 12 based on the upward-directed, upward-downward-direction force F1 that is exerted from the wheel 30 to the wheel-side attachment portion 18, can be changed depending upon the second arm length A2. In addition, a magnitude of an angular moment M3 exerted to the main portion 12 based on the lateral-direction force F2 that is exerted from the road surface to the wheel-side attachment portion 18, can be changed depending upon the first arm length A1. The angular moment M3 based on the lateral-direction force F2 operates as a moment to twist the main portion 12. More specifically explained, as conceptually shown in FIG. 13, since, owing to the lateral-direction force F2, the main portion 12 is subjected to a bending elastic deformation, there arises a tendency that the wheel-side attachment portion 18 is moved clockwise in its plan view; and since owing to the angular moment M3 the main portion 12 is subjected to a twisting elastic deformation, there arises a tendency that the wheel-side attachment portion 18 is moved counterclockwise in its plan view. In fact, the wheel-side attachment portion 18 is subjected to a displacement (i.e., a rotation) as a sum of the two tendencies. That is, if respective strengths of the two tendencies are comparable to each other, the wheel-side attachment portion 18 is subjected to just a translation in the lateral direction; if the tendency of rotation based on the bending elastic deformation is stronger, the wheel-side attachment portion 18 is subjected to a clockwise rotation, so that the wheel 30 is moved toward the toe-out side (FIG. 5); and if the tendency of rotation based on the twisting elastic deformation is stronger, the wheel-side attachment portion 18 is subjected to a counterclockwise rotation, so that the wheel 30 is moved toward the toe-in side.

Figure 14:
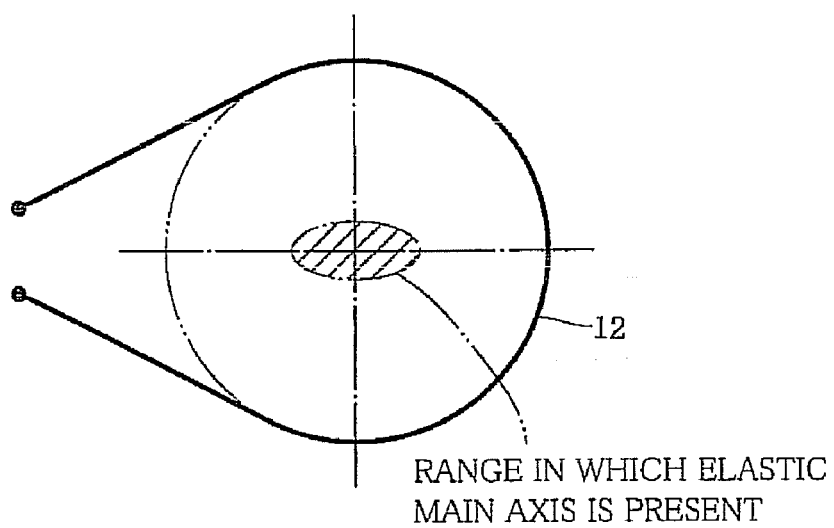
FIG. 14 is a view for explaining an operation of the suspension apparatus of FIG. 13.
Figure 15:
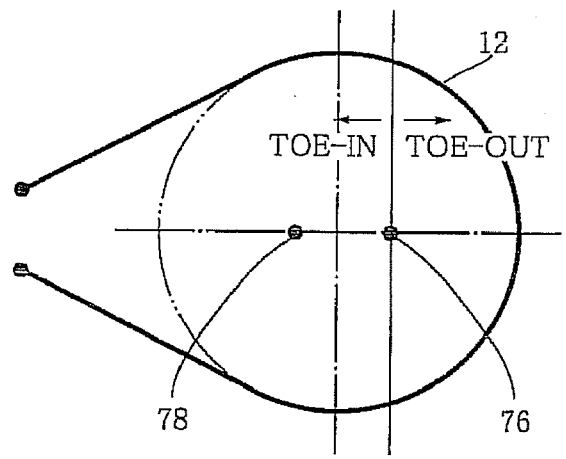
FIG. 15 is a view for explaining the operation of the suspension apparatus of FIG. 13.

In the above-described case where the respective strengths of the two tendencies are comparable to each other and the wheel-side attachment portion 18 is just translated in the lateral direction, the lateral-direction force F2 may be said as operating on an elastic main axis of the main suspension member 10. For example, regarding an embodiment, shown in FIG. 14, wherein a main portion 12 has a C-shaped profile defined by an arc and two tangential lines thereof, an elastic main axis with respect to a lateral force is located in a hatched area in the vicinity of the center of the arc. Assuming that, as shown in FIG. 15, the elastic main axis is located at a point 76 and the lateral-direction force F2 is exerted to a point 78 (i.e., a centerline of an axle shaft of the wheel 30 passes through the point 78), the wheel 30 has a tendency to move toward the toe-in side. That is, if the centerline of the shaft of the wheel 30 is located in front of the elastic main axis, then the wheel 30 has the tendency toward the toe-in side; and if the centerline of the shaft of the wheel 30 is located in rear of the elastic main axis, then the wheel 30 has the tendency toward the toe-out side. In addition, assuming that the lateral-direction force F2 is constant, the tendency toward the toe-in or toe-out side increases as the distance of the centerline of the shaft of the wheel 30 from the elastic main axis increases. In other words, even though the main portion 12 may not be modified, the change of the toe angle based on the lateral-direction force F2 can be arbitrarily modified by selecting the first arm length A1 (i.e., selecting the position of the shaft of the wheel 30).

(viii) Inclining of the main suspension member 10 relative to the front-rear direction of the vehicle's body.

Figure 16:
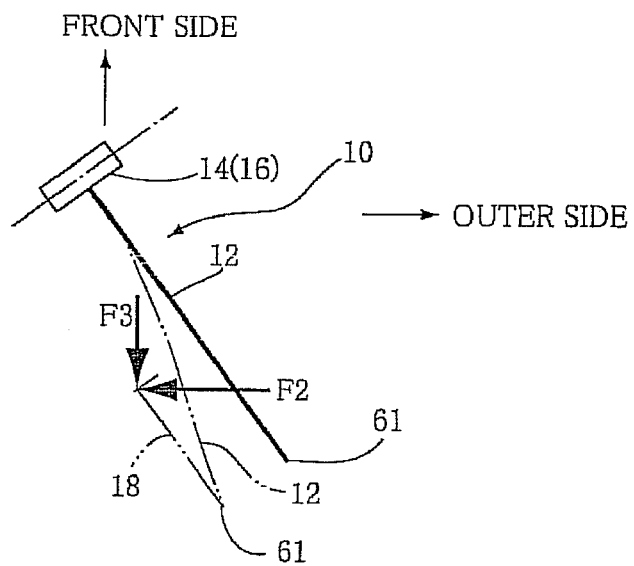
FIG. 16 is a plan view for explaining a deformation of a main suspension member of another suspension apparatus as another embodiment of the present invention when a lateral-direction force and a front-rear-direction force are exerted to the suspension apparatus.

Item (vii) has been explained with respect to the embodiment where the main portion 12 extends parallel to the front-rear direction of the vehicle's body. However, as shown in FIG. 16, it is possible to incline the main portion 12 relative to the front-rear direction of the vehicle's body in its plan view. In this case, the change of the toe angle can be modified based on not only the lateral-direction force F2 but also the front-rear-direction force F3. Respective proportions of the change of the toe angle based on the lateral-direction force F2 and the change of the toe angle based on the front-rear-direction force F3 can be changed by changing an angle of inclination of the main portion 12 relative to the front-rear direction of the vehicle's body.

In the embodiment shown in FIG. 16, the respective pivotal axes of the two body-side attachment portions 14, 16 are parallel to each other, are offset from each other in the upward-downward direction of the vehicle's body, and are inclined relative to the lateral direction of the body. However, these features are not essentially required. Regarding the embodiment shown in FIG. 16, the two body-side attachment portions 14, 16 are not offset from each other in a direction parallel to the respective pivotal axes thereof, and the neutral axis of the main portion 12 is located on a single plane perpendicular to those pivotal axes. Therefore, an angle of inclination of the main suspension member 10 relative to the front-rear direction of the vehicle's body is simply equal to an angle of inclination of the above-indicated single plane relative to the front-rear direction. In contrast, in the case where the two body-side attachment portions 14, 16 are offset from each other in the direction parallel to the respective pivotal axes thereof, or the respective pivotal axes of the two body-side attachment portions 14, 16 are inclined relative to each other, the neutral axis of the main portion 12 is not located on a single plane. In this case, an angle of inclination of the main suspension member 10 cannot be univocally determined. Hence, in an embodiment shown in FIG. 17, a reference plane 98 is conveniently defined as a vertical plane that passes through (a) a middle point 94 between a first intersection point 90 and a second intersection point 92 where respective pivotal axes 80, 82 of the two body-side attachment portions 14, 16 intersect two extension lines 84, 86 that are extended from opposite ends of the neutral axis of the main portion 12 and (b) a most distant point 96 on the neutral axis that is the most distant from the middle point 94, and an angle of inclination of the reference plane 98 relative to the front-rear direction of the vehicle's body is defined as the angle of inclination of the main suspension member 10 relative to the front-rear direction. That is, the first intersection point 90 is regarded as representing the first body-side attachment portion 14; and the second intersection point 92 is regarded as representing the second body-side attachment portion 16. However, a relative position between the main portion 12 and the two body-side attachments portions 14, 16 may not be so determined that the respective points representing the two body-side attachment portions 14, 16 coincide with the respective middle points of those portions 14, 16 with respect to the respective axial directions thereof. That is, depending upon the circumstances, the respective axial-direction middle points of the two body-side attachment portions 14, 16 may be intentionally offset from the respective points representing the two attachment portions 14, 16. In the last case, the respective axial-direction middle points of the two body-side attachment portions 14, 16 may be newly defined as the respective points representing the two attachment portions 14, 16. However, it can be said as reasonable to define, as the respective points representing the two body-side attachment portions 14, 16, the first intersection point 90 and the second intersection point 92 where the respective pivotal axes 80, 82 of the two portions 14, 16 intersect the two extension lines 84, 86. Thus, the reference plane 98 of the main suspension member 10 is defined as explained above. Using this definition of the reference plane 98, the angle of inclination of the main suspension member 10 relative to the front-rear direction can be discussed irrespective of which shape the member 10 may have.

(ix) Inclining of the virtual pivotal plane of the main suspension member 10 relative to the front-rear direction of the vehicle's body.

In the embodiment shown in FIG. 16, the respective pivotal axes of the two body-side attachment portions 14, 16 are parallel to each other, and accordingly it is generally said to be reasonable to assume that the main suspension member 10 is pivoted along a plane that perpendicularly intersects those pivotal axes. On this assumption, it is also reasonable to (a) define a virtual straight line which passes through a middle point of a straight segment connecting between a first intersection point and a second intersection point that are determined for the two body-side attachment portions 14, 16, respectively, in the same manner as described above with respect to Item (viii), and which extends parallel to the respective pivotal axes of the two body-side attachment portions 14, 16, and (b) assume that the main suspension member 10 is pivoted about the virtual straight line. The virtual straight line may not accurately coincide with an actual pivotal axis of the main suspension member 10, because of the shape of the main portion 12, in particular, a difference of respective lengths of respective neutral axes, or a difference of respective curved shapes, of (a) the first portion of the main portion 12 located between the body-side attachment portions 14 and the wheel-side attachment portion 18 and (b) the second portion of the main portion 12 located between the body-side attachment portions 16 and the wheel-side attachment portion 18. However, in many cases, an amount of deviation of the virtual straight line (i.e., the virtual pivotal axis) from the actual pivotal axis is considerably small. Thus, it is generally said to be reasonable to assume that the main suspension member 10 is pivoted about the virtual pivotal axis. That is, the embodiment shown in FIG. 16 meets both the condition described at Item (viii) and the condition described at Item (ix).

In the case where the virtual pivotal axis of the main suspension member 10 is inclined relative to the lateral direction of the vehicle's body and a virtual pivotal plane that perpendicularly intersects the virtual pivotal axis is inclined relative to the front-rear direction of the vehicle's body, the toe angle, or the camber angle, of the wheel 30 held by the main suspension member 10 is changed with the upward-downward-direction stroke of the wheel 30, like a toe angle, or a camber angle, of a wheel held by a conventional semi-trailing-arm-type suspension device. Thus, inclining the virtual pivotal plane relative to the front-rear direction of the vehicle's body can be utilized as means for adjusting the alignment of the wheel 30.

Figure 17:
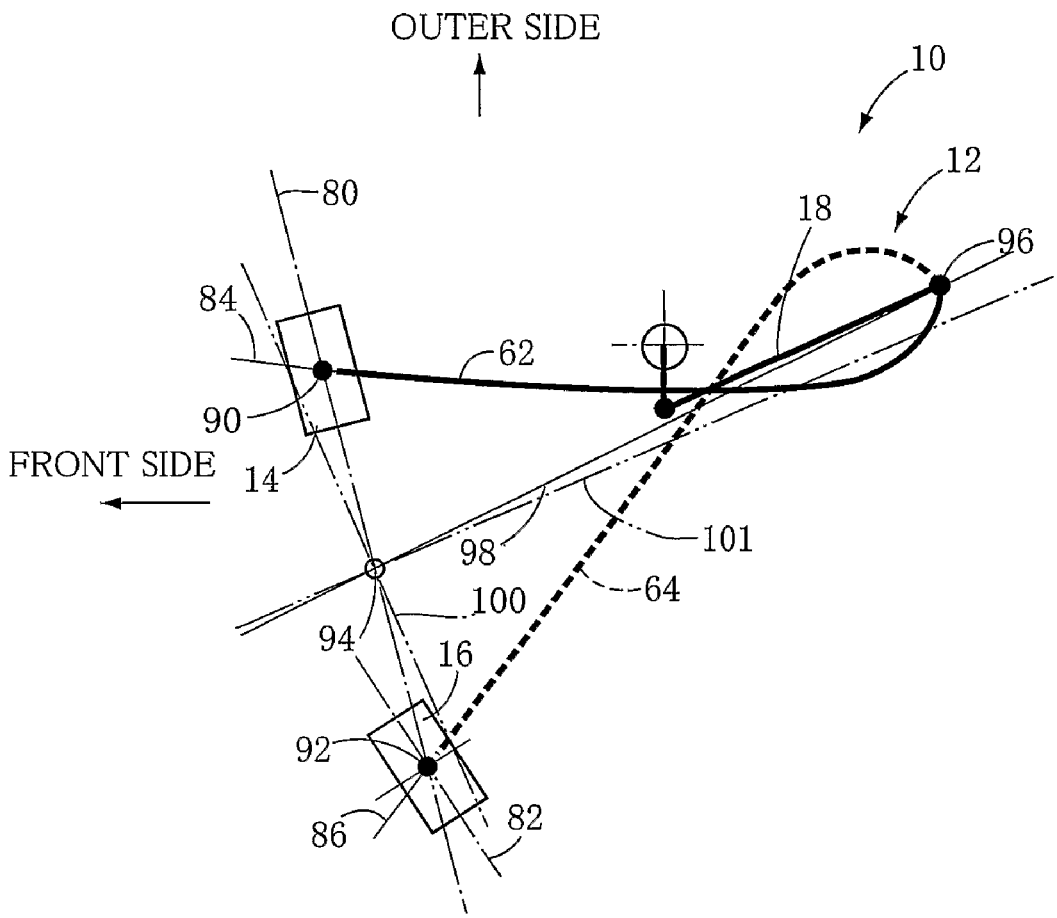
FIG. 17 is a plan view for explaining an angle of inclination of a main suspension member of another suspension apparatus, as another embodiment of the present invention, that is defined relative to a front-rear direction of a vehicle's body.

In an embodiment, shown in FIG. 17, in which the two body-side attachment portions 14, 16 are offset from each other in the direction parallel to the respective pivotal axes thereof, or the respective pivotal axes of the two body-side attachment portions 14, 16 are inclined relative to each other, a virtual pivotal axis and/or a virtual pivotal plane of the main suspension member 10 cannot be easily determined or defined. Hence, in this case, a virtual pivotal axis 100 and a virtual pivotal plane 101 are determined or defined as follows: First, a first intersection point 90 and a second intersection point 92 where the respective pivotal axes 80, 82 of the two body-side attachment portions 14, 16 respectively intersect two extension lines 84, 86 that are respectively extended from opposite ends of the neutral axis of the main portion 12, are determined; then a middle point 94 of the first and second intersection points 90, 92 that is located on a straight line passing through the points 90, 92, is determined; and a straight line that passes through the middle point 94 and extends in a direction as an average of respective directions in which the two pivotal axes 80, 82 extend, is determined as the virtual pivotal axis 100, and a plane that perpendicularly intersects the virtual pivotal axis 100, is determined as the virtual pivotal plane 101. Regarding the embodiment shown in the plan view of FIG. 17, the virtual pivotal axis 100 is defined by a bisector (i.e., a straight line) that passes through the middle point 94 and extends in a direction that equally divides an angle contained by the two pivotal axes 80, 82. Since the virtual pivotal axis 100 is inclined relative to the lateral direction of the vehicle's body, the main suspension member 10 can enjoy the advantages described at Item (ix).

(x) Inclining of the main suspension member 10 relative to the upward-downward direction of the vehicle's body (i.e., a vertical direction).

Figure 18:
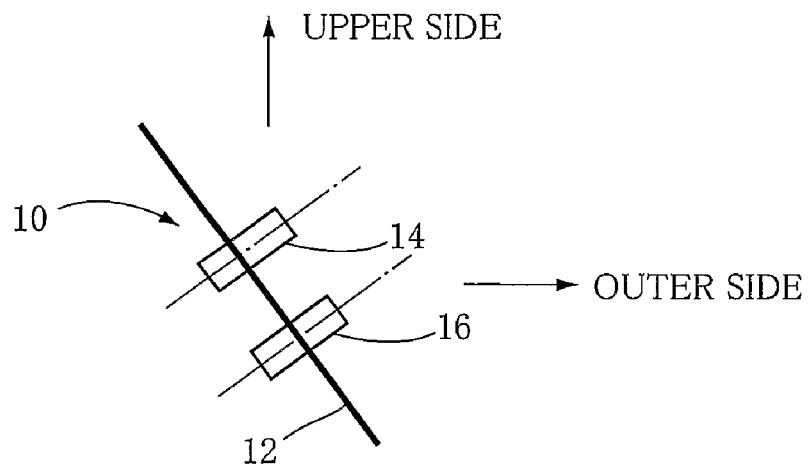
FIG. 18 is a rear view of another suspension apparatus as another embodiment of the present invention.

In addition to, or in place of, inclining the main suspension member 10 relative to the front-rear direction of the vehicle's body, as described above, it is possible to incline the main suspension member 10 relative to the upward-downward direction of the vehicle's body. In the case where the main suspension member 10 is inclined relative to the upward-downward direction of the body, for example, the main member 10 may be provided in an inner space of the wheel 30, or a drive device and/or a brake device can be easily provided in the vicinity of the main member 10. FIG. 18 shows a main suspension member 10 that is inclined relative to only the upward-downward direction of the vehicle's body. The above-explained problem with the feature of inclining the main suspension member 10 relative to the front-rear direction also occurs to the feature of inclining the main suspension member 10 relative to the upward-downward direction. As far as the present specification is concerned, an angle of inclination of the main suspension member 10 relative to the upward-downward direction of the vehicle's body is determined as follows: Regarding, e.g., an embodiment shown in FIG. 19, first, a first intersection point 90 and a second intersection point 92 where the respective pivotal axes of the two body-side attachment portions 14, 16 respectively intersect two extension lines that are respectively extended from opposite ends of the neutral axis of the main portion 12, are determined; then a middle point 94 between the first and second intersection points 90, 92 that is located on a straight line passing through the two points 90, 92, is determined; a plane that contains the middle point 94, and an uppermost point 102, and a lowermost point 104, of the neutral axis of the main portion 12, is determined as a reference plane 106; and an angle of inclination of the reference plane 106 relative to the upward-downward direction of the vehicle's body is determined as the angle of inclination of the main suspension member 10 relative to the upward-downward direction.

Figure 19:
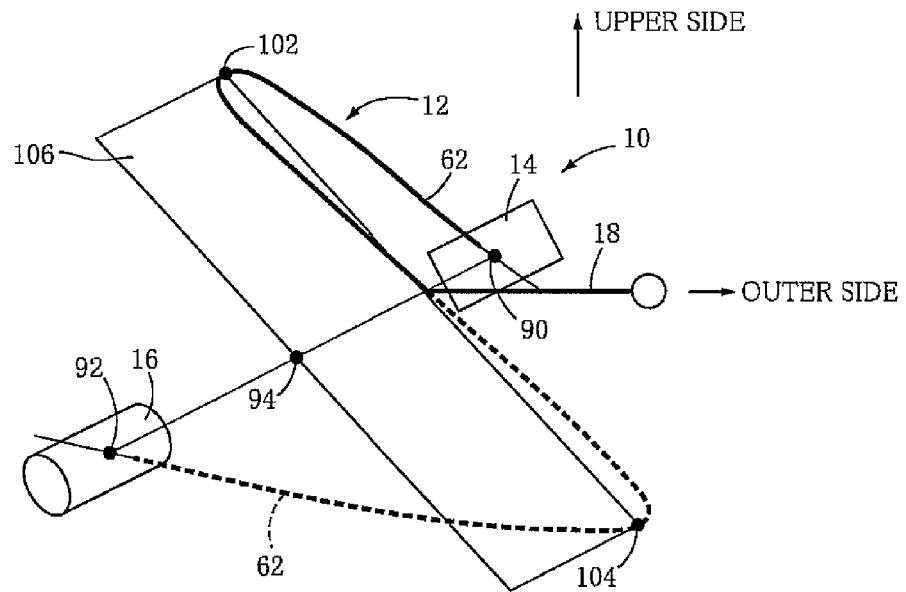
FIG. 19 is a rear view for explaining an angle of inclination of a main suspension member of another suspension apparatus, as another embodiment of the present invention, that is defined relative to an upward-downward direction of a vehicle's body.

In the embodiment shown in FIG. 19, the main suspension member 10 is inclined relative to not only the upward-downward direction of the vehicle's body but also the front-rear direction thereof. Hence, if the reference plane of the main suspension member 10 is defined by two methods, i.e., the method described with respect to Item (viii) and the method described with respect to the present item, i.e., Item (x), then two reference planes can be obtained for the single main suspension member 10. In this case, theoretically, the main suspension member 10 may have two inclination angles each relative to the upward-downward direction of the vehicle's body, and two inclination angles each relative to the front-rear direction thereof.

Practically, however, it is easier to think that the main suspension member 10 has a single reference plane, and that respective inclination angles of the single reference plane relative to the upward-downward and front-rear directions of the vehicle's body are respective inclination angles of the main suspension member 10 relative to the upward-downward and front-rear directions. To this end, it is possible to think that the above-described reference plane 106 that contains the middle point 94 and the uppermost and lowermost points 102, 104 is the only reference plane of the main suspension member 10. Alternatively, it is possible to determine one plane that has respective inclination angles relative to the upward-downward and front-rear directions, obtained based on the two reference planes 98, 106, and that has a minimum sum of the respective squares of respective distances thereof from the middle point 94, the uppermost and lowermost points 102, 104, and the most distant point 96, and define said one plane as the only reference plane of the main suspension member 10. Otherwise, it is possible to determine one plane that has a minimum sum of the respective squares of respective distances thereof from the middle point 94, the uppermost and lowermost points 102, 104, and the most distant point 96, and define said one plane as the only reference plane of the main suspension member 10.

(xi) Inclining of the virtual pivotal plane of the main suspension member 10 relative to the upward-downward direction of the vehicle's body.

In the embodiment shown in FIG. 18, the main suspension member 10 is inclined relative to the upward-downward direction of the vehicle's body, and the virtual pivotal plane of the main suspension member 10 is also inclined relative to the upward-downward direction. If the virtual pivotal plane of the main suspension member 10 is inclined relative to the upward-downward direction, and an inclination angle of the virtual pivotal plane is adjusted, then respective directions in which the main member 10 can be easily elastically deformed and cannot be easily elastically deformed can be adjusted with respect to respective angles thereof relative to the upward-downward direction of the vehicle's body or the lateral direction thereof. Thus, for example, a roll center of the vehicle's body can be easily adjusted. Hereinafter, this feature will be described in more detail.

Figure 20:
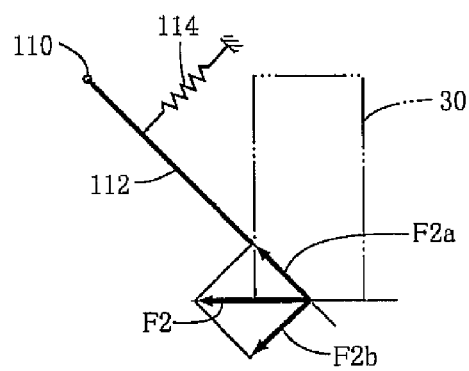
FIG. 20 is a view for explaining an operation of the suspension apparatus of FIG. 18.

As shown in FIG. 20, a conventional suspension device as a whole can be modeled by being substituted by a link 112 that is not easily elastically deformed (i.e., has a high rigidity) and is pivotable about a pivotal axis 110, and a spring 114 that is easily elastically deformed when the link 112 is pivoted (i.e., has a low rigidity). If the thus modeled suspension device receives the lateral-direction force F2 from the wheel 30, then the link 112 and the spring 114 receive, by sharing, the lateral-direction force F2. A component received by the link 112 will be referred to as the link-shared component F2$a$; and a component received by the spring 114 will be referred to as the spring-shared component F2$b$. Since the rigidity of the link 112 is high, a displacement of the wheel 30 due to the link-shared component F2$a$ is small; and since the rigidity of the spring 114 is low, a displacement of the wheel 30 due to the spring-shared component F2$b$ is large. Thus, a direction in which the wheel 30 can be easily displaced (or cannot be easily displaced) can be changed by changing the inclination angle of the link 112 relative to the upward-downward, or lateral, direction of the vehicle's body.

Figure 21:
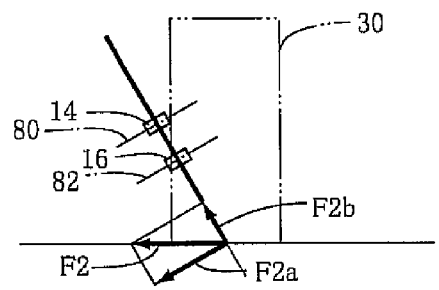
FIG. 21 is a view for explaining the operation of the suspension apparatus of FIG. 18.

Likewise, the suspension apparatus, shown in FIG. 18, has a direction in which the apparatus exhibits a high rigidity, and a direction in which the apparatus exhibits a low rigidity. As described above, the main portion 12 is easily elastically deformed in the first direction perpendicular to the respective pivotal axes of the two body-side attachment portions 14, 16, but is not easily elastically deformed in the second direction parallel to those pivotal axes. Thus, for a force exerted thereto in the first direction, the main portion 12 functions as a spring; and for a force exerted thereto in the second direction, the main portion 12 functions as a link. Therefore, as shown in FIG. 21, when the lateral-direction force F2 is exerted to the wheel 30, the link-shared component F2$a$ and the spring-shared component F2$b$ have respective directions indicated in the figure. As compared with the conventional suspension device shown in FIG. 20, it appears that regarding the embodiment shown in FIG. 21, the link-shared component F2$a$ and the spring-shared component F2$b$ have been replaced with each other. However, like the conventional suspension device shown in FIG. 20, the suspension apparatus shown in FIG. 21 has a direction in which the apparatus exhibits a high rigidity, and a direction in which the apparatus exhibits a low rigidity. Thus, like the conventional suspension device, the suspension apparatus shown in FIG. 21 can be utilized to adjust the roll center of the vehicle's body.

Figure 22:
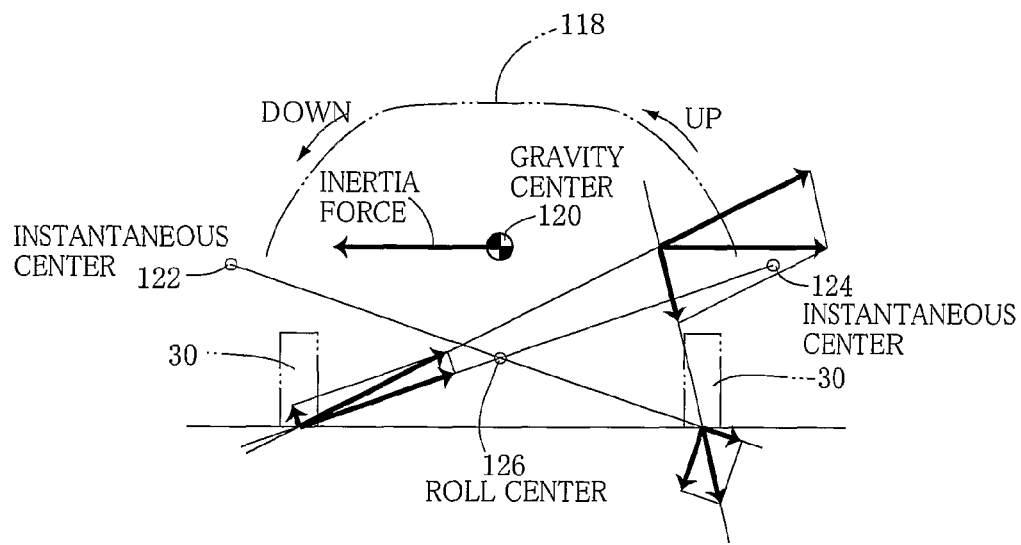
FIG. 22 is a view for explaining the operation of the suspension apparatus of FIG. 18.

FIG. 22 shows the vehicle in a state in which it is turning rightward. As illustrated in FIG. 22, an angular moment based on an inertia force exerted to a gravity center 120 of a vehicle's body 118, is received by a road surface via left and right wheels 30. In this event, it can be said that the left and right wheels 30 are revolved relative to the body 118, owing to the respective suspension apparatuses 10, about respective instantaneous centers 122, 124 each of which is defined by respective directions of the link-shared component F2$a$ and the spring-shared component F2$b$. An intersection point of respective straight lines one of which connects between the instantaneous center 122 and a contact point where the corresponding wheel 30 contacts the road surface and the other of which connects between the instantaneous center 124 and a contact point where the corresponding, other wheel 30 contacts the road surface, is defined as a roll center 126 of the body 118. Therefore, a position of the roll center 126 of the body 118 can be adjusted by adjusting the respective directions of the link-shared component F2$a$ and the spring-shared component F2$b$ received by each of the main suspension members 10, in other words, the direction of the virtual pivotal plane of each of the main suspension members 10 as seen in a view taken in the front-rear direction of the body 118.

In each of the above-described embodiments, the two body-side attachment portions 14, 16 are attached to the two brackets 22, 24, respectively, such that each of the two attachment portions 14, 16 is not movable in the axial direction thereof. However, it is possible that one of the two body-side attachment portions 14, 16 be immovable in the axial direction thereof but the other of the two attachment portions 14, 16 is movable in the axial direction thereof, as shown in FIG. 23.

Figure 23:
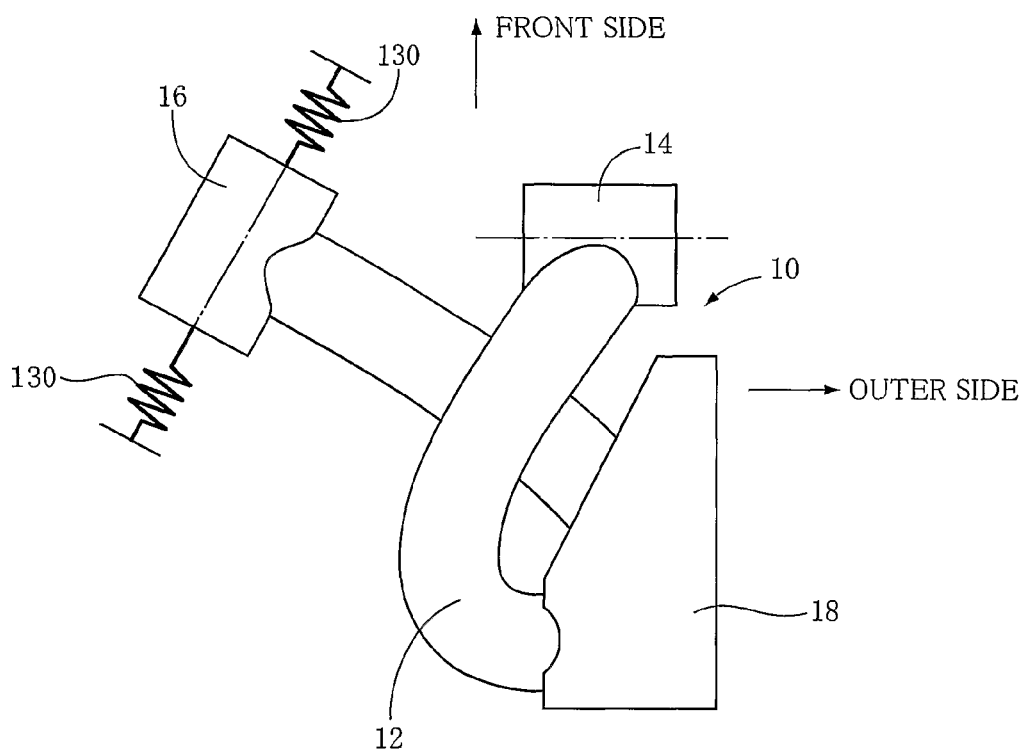
FIG. 23 is a plan view of a main suspension member of another suspension apparatus as another embodiment of the present invention.

In an embodiment shown in FIG. 23, the first body-side attachment portion 14 is not movable in its axial direction but the second body-side attachment portion 16 is movable in its axial direction. This embodiment employs a pair of elastic members 130 that produce, as the body-side attachment portion 16 is moved in its axial direction, an elastic force to return the attachment portion 16 to its initial position. However, it is possible to provide the body-side attachment portion 16 such that the attachment portion 16 is freely movable in its axial direction, i.e., is movable without receiving a resisting force in the axial direction. In the latter case, the elastic deformation (in particular, twisting elastic deformation) of the main portion 12 is easier, and the elastic-deformation capability of the main suspension member 10 is higher.

In an embodiment shown in FIG. 23, the respective pivotal axes of the two body-side attachment portions 14, 16 are inclined relative to each other by a sufficiently large angle. In this case, it is possible that both the two body-side attachment portions 14, 16 be freely movable in the respective axial directions thereof, because the position of the main suspension member 10 in the lateral direction of the vehicle's body is univocally determined. However, in the case where the respective pivotal axes of the two attachment portions 14, 16 are inclined relative to each other by only a small angle, or in the case where the two pivotal axes are parallel to each other, it is preferred that one of the two attachment portions 14, 16 be not movable in its axial direction or be less movable than the other of the two portions 14, 16.

In many cases, it is possible to employ a main suspension member 10 having desired suspension characteristics, by combining two or more of the above-described measures or conditions described at Items (i) through (xi). To this end, it is preferred to calculate, using a finite element method or the like, a strain, a stress and/or a displacement of each portion of the main suspension member 10. However, this calculation is not essentially required. For example, it is possible to produce a prototype, perform an experiment to measure the behavior of the prototype, and improve the prototype so as to have desired suspension characteristics.

Figure 24A:
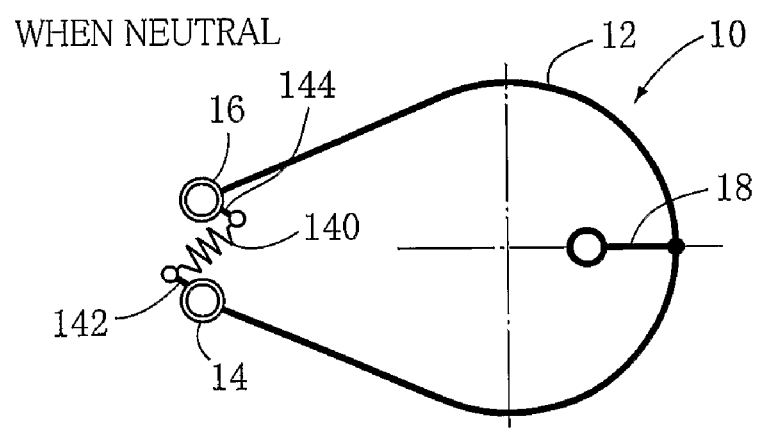
FIG. 24A is a side view showing another suspension apparatus as another embodiment of the present invention in a state in which a wheel is at a neutral position.
Figure 24B:
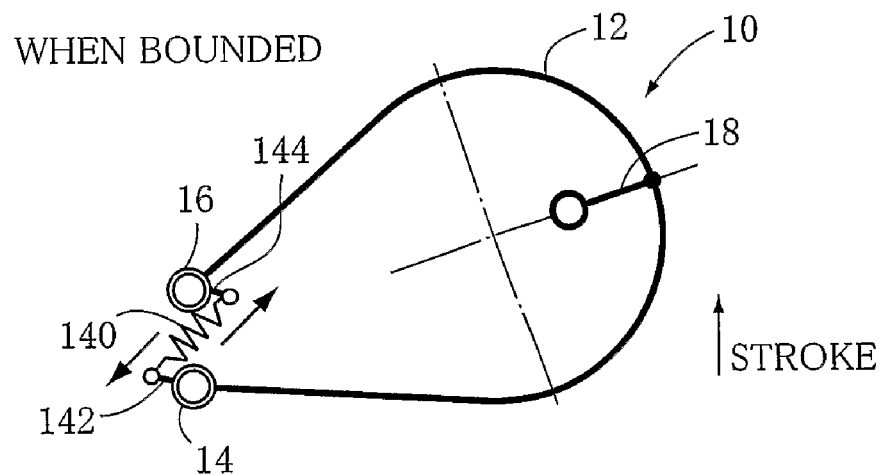
FIG. 24B is a side view showing the suspension apparatus of FIG. 24A in a state in which the wheel is bounded.

FIGS. 24A and 24B show another embodiment. In this embodiment, the main suspension member 10 is provided with an auxiliary spring 140. When the main suspension member 10 is pivoted upward from a neutral position thereof shown in FIG. 24A to an upper position shown in FIG. 24B, the two body-side attachment portions 14, 16 are pivoted in the same direction. The auxiliary spring 140 is provided between two spring holding portions 142, 144 a distance of which is changed as the two attachment portions 14, 16 are pivoted. In this embodiment, the two spring-holding portions 142, 144 are provided by two spring-holding pins that radially outward project from respective specific portions of the two attachment portions 14, 16 a distance of which increases as the two attachment portions 14, 16 are pivoted. The auxiliary spring 140 is provided by a tensile coil spring located between the two spring holding pins 142, 144. Thus, when the main suspension member 10 is pivoted upward as described above, the auxiliary spring 140 is stretched or extended and accordingly the elastic-deformation capability of the main suspension member 10 is lowered as such. This is equivalent to the increase of spring constant of the suspension member 10. Therefore, if the auxiliary spring 140 is attached to, or detached from, the suspension member 10, or if one auxiliary spring 140 is replaced with another auxiliary spring 140 having a different spring constant than that of the one spring 140, the spring constant of the suspension member 10 can be changed to each of a plurality of steps.

This embodiment can be utilized for a case where a single type of automotive cars is modified to have different overall weights. For example, if the auxiliary spring 140 is attached to, or detached from, the main suspension member 10, those automotive cars that have the different overall weights can be adjusted to take a same body's height or level when each car is in its neutral state. In addition, this embodiment can be utilized for another case where an identical suspension device is commonly employed by different types of automotive cars. In the latter case, those automotive cars can take respective desired body's height or levels when each car is in its neutral state.

A suspension apparatus in accordance with the present invention can enjoy a simple construction and accordingly a drive device and/or a brake device for the wheel 30 can be easily provided in an inner space of the wheel frame 36.

Figure 25:
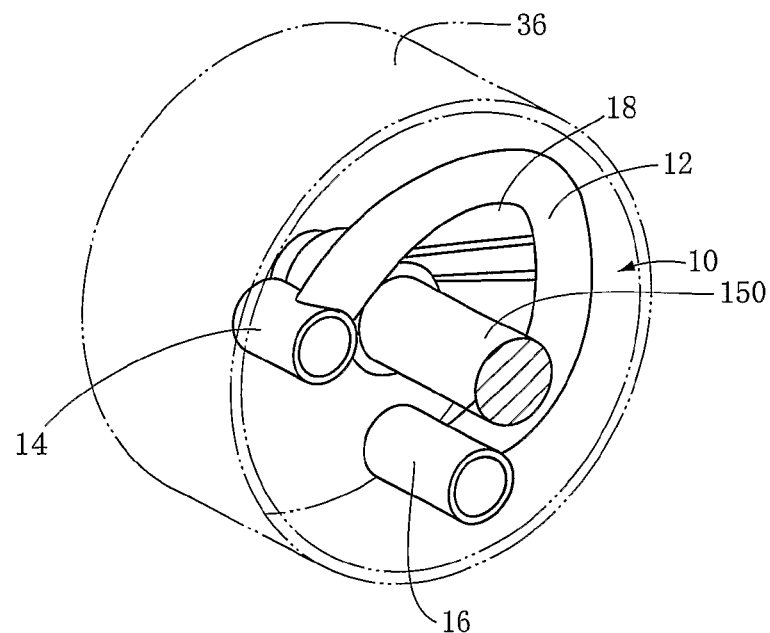
FIG. 25 is a perspective view showing an arrangement in which the suspension apparatus of FIG. 1 and a drive device are provided.
Figure 26:
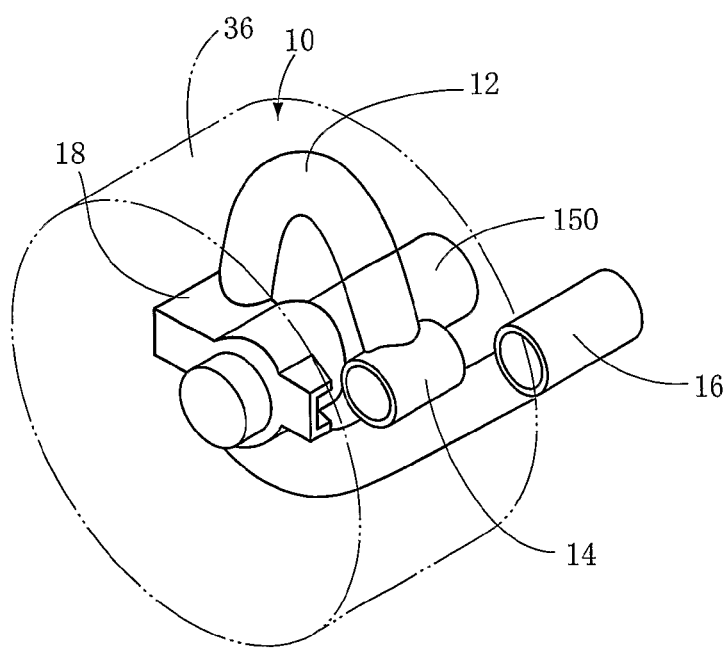
FIG. 26 is a perspective view of the arrangement shown in FIG. 25, taken in a different direction.

FIGS. 25 through 29 show some embodiments in which a drive device is provided. More specifically explained, FIGS. 25 and 26 show an embodiment in which a drive source of the drive device is provided outside the inner space of the wheel frame 36 and the wheel 30 is driven by the drive source via a drive shaft 150 extending through the wheel-side attachment portion 18.

Figure 27:
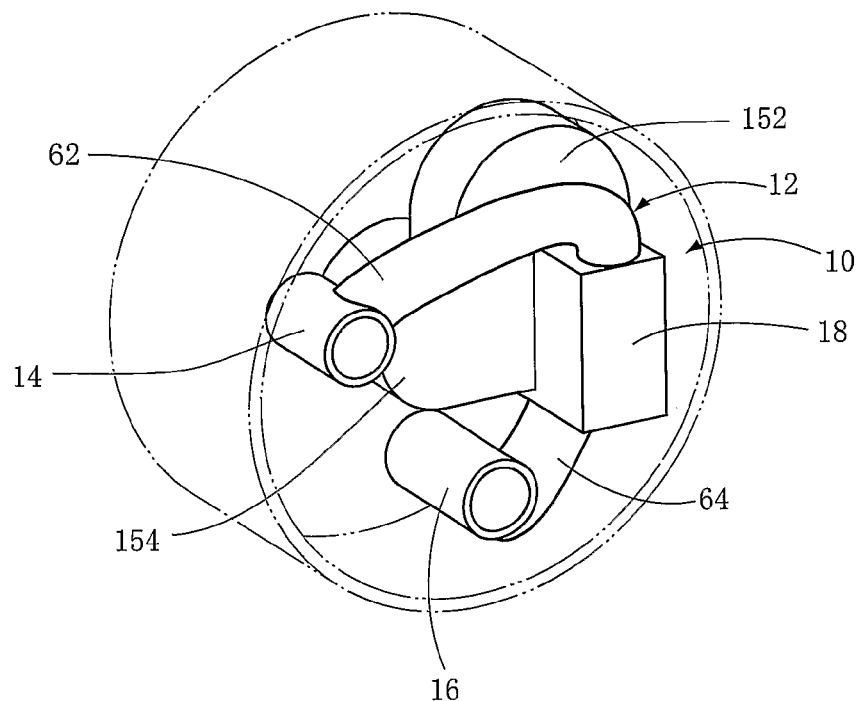
FIG. 27 is a perspective view showing an arrangement in which the suspension apparatus of FIG. 1 and another drive device are provided.
Figure 28:
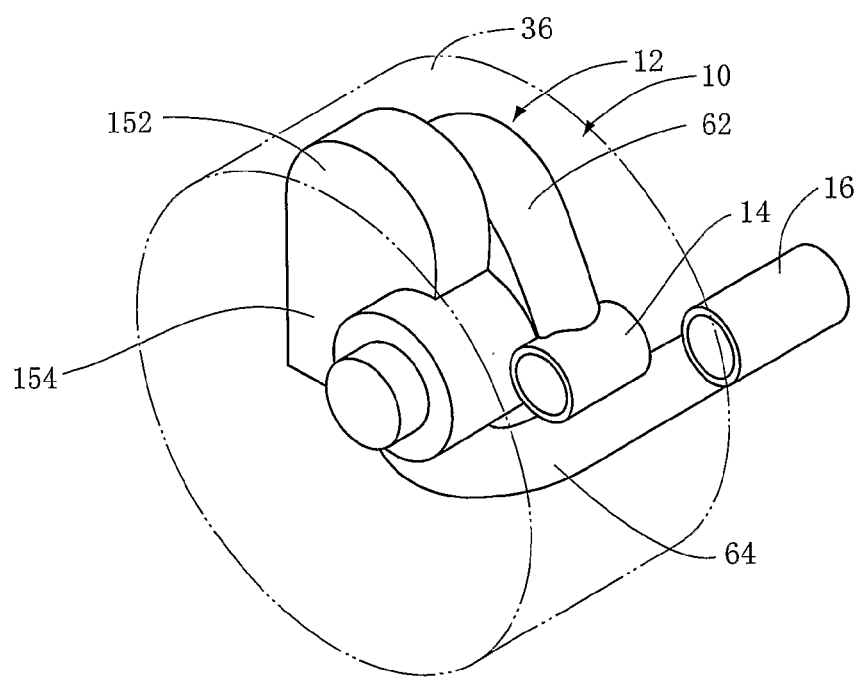
FIG. 28 is a perspective view of the arrangement shown in FIG. 27, taken in a different direction.

FIGS. 27 and 28 show an embodiment in which an entirety of a drive device including an electric motor 152 as its drive source is provided in the inner space of the wheel frame 36. The electric motor 152 is an inner-rotor-type electric motor whose rotary torque is transmitted to the wheel frame 36 via a reduction-gear unit 154. The electric motor 152 and the reduction-gear unit 154 are attached to the wheel-side attachment portion 18, such that generally, the motor 152 and the reduction-gear unit 154 are provided between the upper portion 62 of the main portion 12 and the wheel disc of the wheel frame 36.

Figure 29:
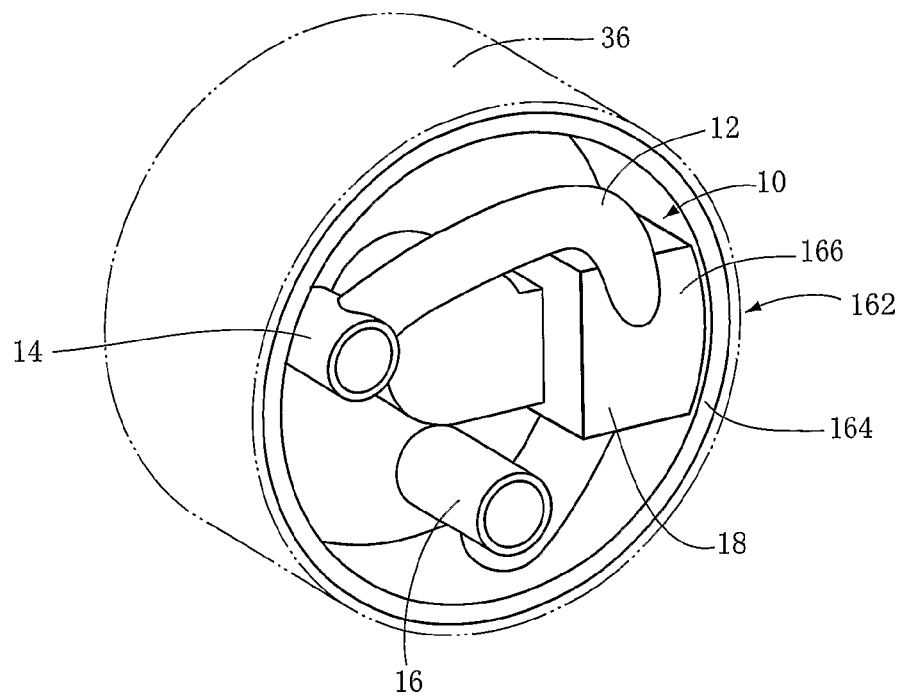
FIG. 29 is a perspective view showing an arrangement in which the suspension apparatus of FIG. 1 and another drive device are provided.

FIG. 29 shows an embodiment in which a drive device including an outer-rotor-type electric motor 162 as its drive source, is provided in the inner space of the wheel frame 36. An outer rotor 164 is fixed to an inner circumferential surface of the wheel frame 36, and an inner stator 166 is fixed to the wheel-side attachment portion 18.

Figure 30:
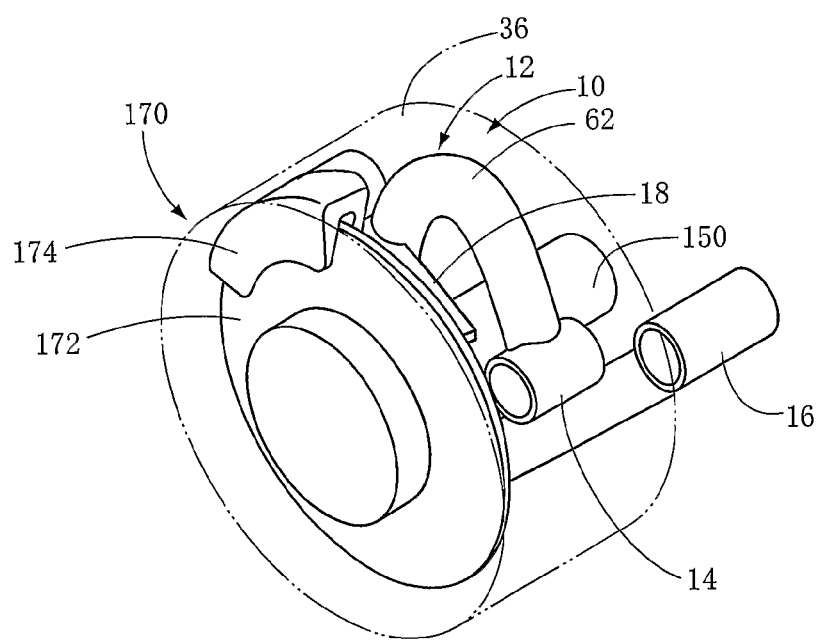
FIG. 30 is a perspective view of an arrangement in which the suspension apparatus and the drive device, each shown in FIGS. 25 and 26, and a brake device are provided.
Figure 31:
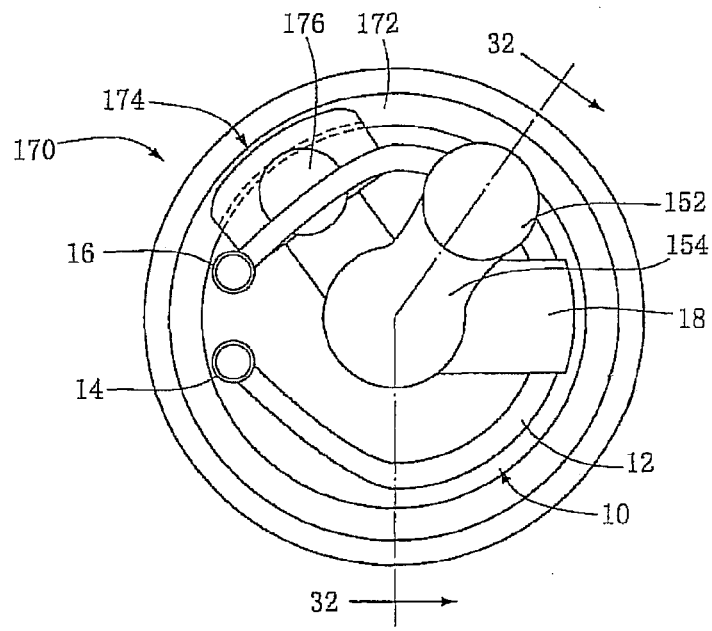
FIG. 31 is a perspective view of an arrangement in which the suspension apparatus and the drive device, each shown in FIGS. 27 and 28, and a brake device are provided.
Figure 32:
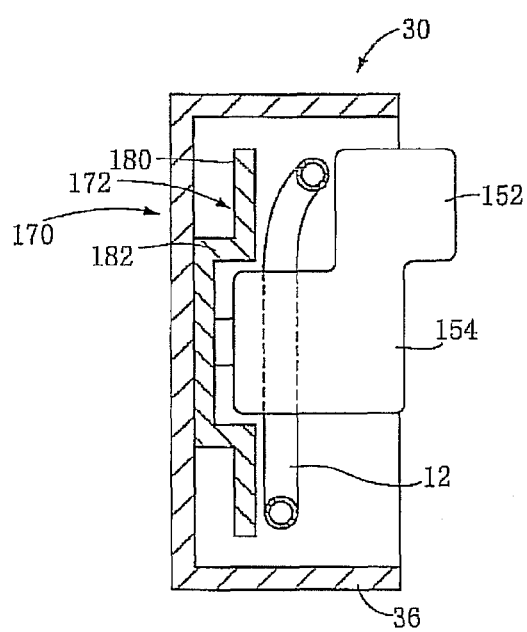
FIG. 32 is a cross-section view taken along arrows 32, 32 shown in FIG. 31.

FIGS. 30 through 32 show embodiments in which a drive device and a brake device are provided in the inner space of the wheel frame 36. More specifically explained, FIG. 30 shows an embodiment in which the drive device, shown in FIGS. 25 and 26, that drives the wheel frame 36 via the drive shaft 150 is provided in combination with a disc brake 170 as the brake device. The disc brake 170 includes a disc rotor 172 fixed to the wheel frame 36, and a caliper 174 attached to the wheel-side attachment portion 18. The caliper 174 has a wheel cylinder 176 that is hydraulically operable to press a brake pad against the disc rotor 172 in an axial direction of the wheel frame 36 and thereby restrain the rotation of the rotor 172. The brake pad is movable in a direction parallel to the axial direction of the wheel frame 36.

FIGS. 31 and 32 show an embodiment in which the drive device, shown in FIGS. 27 and 28, that includes the inner-rotor-type electric motor 152 and the reduction-gear unit 154 is provided in combination with the above-described disc brake 170. The disc rotor 172 is of a hat type including an annular friction-plate portion 180 and a bottomed cylindrical portion 182. The electric motor 152 is provided adjacent to the friction-plate portion 180, as seen in the axial direction of the wheel frame 36, and a portion of the reduction-gear unit 154 is provided in an inner space of the cylindrical portion 182. The caliper 174 is provided such that the wheel cylinder 176 thereof is located between (a) a specific portion of the main portion 12 that is adjacent to the body-side attachment portion 16 and (b) the disc rotor 172, and is attached to the wheel-side attachment portion 18 either directly, or indirectly via a casing of the reduction-gear unit 154.

The details of the embodiments shown in FIGS. 30 through 32 are not essentially required. For example, a flange portion projecting radially inward from the inner circumferential surface of the wheel rim may be utilized as the disc rotor. In addition, the caliper may be provided at a position that is arbitrarily selected in a space that is present between the main suspension member 10 and the wheel disc and that has a sufficiently large axial-direction size. For example, in the case where the body-side attachment portion 14 is provided adjacent to the wheel disc, the caliper may be provided in a space that is located inward of the attachment portion 14 with respect to the lateral direction of vehicle's body.

In each of the illustrated embodiments, the shock absorber 32 is provided between the wheel-side attachment portion 18 and the vehicle's body. A damping effect may be obtained in the case where the shock absorber 32 is provided between the vehicle's body and an arbitrary portion of the main portion 12. In this case, however, an elastic-deformation mode of the main portion 12 is changed by a force exerted thereto from the shock absorber 32, and it becomes difficult to obtain desired changes of alignment of the wheel 30. In contrast, if the shock absorber 32 is provided between the wheel-side attachment portion 18 and the vehicle's body, as described above, then the force exerted from the shock absorber 32 is just added to the force exerted from the wheel frame 36, and accordingly the elastic-deformation mode of the main portion 12 is less influenced or the influence, if any, can be easily taken into account. Thus, the desired changes of alignment of the wheel 30 can be easily obtained.

Figure 33:
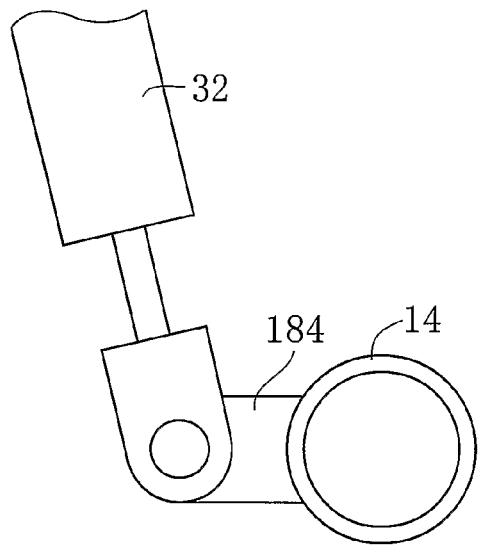
FIG. 33 is a side view of a portion of another suspension apparatus as another embodiment of the present invention.

For the same reason as described above, it is recommended to provide the shock absorber 32 between the vehicle's body and at least one of the two body-side attachment portions 14, 16. For example, as shown in FIG. 33, an arm portion 184 is projected radially outward from either one, or each one, of the two body-side attachment portions 14, 16, and the shock absorber 32 is provided between the vehicle's body and a free end of the arm portion 184. Alternatively, it is possible to provide a rotary damper between at least one of the two body-side attachment portions 14, 16 and at least one of the two brackets 22, 24 that hold the two attachment portions 14, 16, respectively, such that each of the two attachment portions 14, 16 is pivotable.

In addition to, or in place of, the damping device constituted by the common shock absorber 32 in which the resistance to flows of fluid is utilized, it is possible to employ a solid-type damping device that damps vibration owing to a frictional force produced between solid members or an internal friction produced in a solid member.

For example, the solid-type damping device may be one including a damping material that is provided along the main portion 12 of the main suspension member 10 and that produces a damping force when the main portion 12 is elastically deformed. Though, in the embodiment shown in FIG. 6, the main portion 12 is constituted by the single band plate 48, the single band plate 48 may be replaced with a plurality of band plates that are superposed on each other and are elastically pressed on each other such that respective major surfaces of the band plates are held in close contact with each other. In the latter case, as the main portion 12 is elastically deformed, the band plates are slid on each other to produce the damping force. Alternatively, a damping material may be provided between the band plates such that the damping material exhibits a damping function. In these cases, the damping device may be said as a stacked-plate-spring-type damping device that also functions as a suspension spring.

Figure 34:
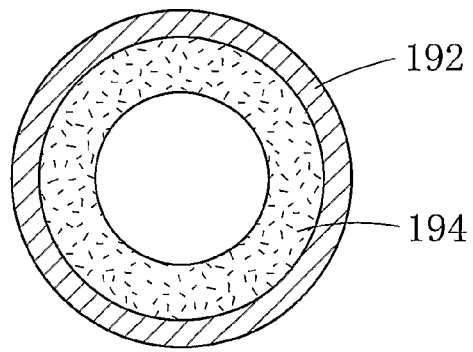
FIG. 34 is a transverse cross-section view of a portion of another suspension apparatus as another embodiment of the present invention.

In the case where the main portion 12 of the main suspension member 10 is constituted by a pipe-like or tubular member, it is preferred that a damping material be provided along an inner circumferential surface of the tubular member. For example, in an embodiment shown in FIG. 34, an inner layer 194 constituted by a material exhibiting a large internal friction, such as a damping rubber, is adhered to an inner circumferential surface of an outer tube 192 as the tubular member.

Figure 35:
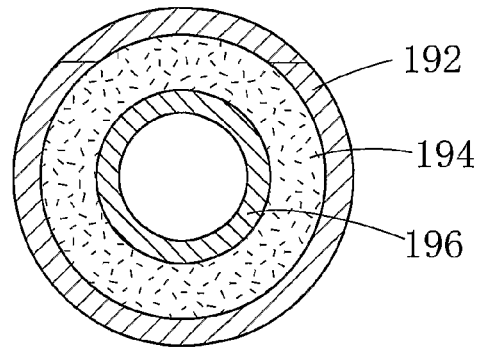
FIG. 35 is a transverse cross-section view of a portion of another suspension apparatus as another embodiment of the present invention.

In addition, in an embodiment shown in FIG. 35, an inner tube 196 is provided inside the inner layer 194. In this case, when the main portion 12 is elastically twisted or bent, the outer tube 192 and the inner tube 196 are moved relative to each other and accordingly the inner layer 194 exhibits a damping effect to advantage.

Thus, if the main suspension member 10 is provided with any means for producing a damping force when the main portion 12 is elastically deformed, as described above, then it is not needed to secure so large a space to accommodate the damping device. Thus, the suspension apparatus as a whole can be provided in a considerably small space.

However, even in the case where the damping device is provided along the main portion 12, the elastic-deformation mode of the main portion may be changed by the damping force and desirable changes of alignment of the wheel 30 may not be obtained. To avoid or attenuate this disadvantage, it is preferred to constitute the damping device such that the resisting force applied to each portion of the main portion 12 by the means for producing the damping force is proportional to the force, or the strain produced thereby, that is exerted to the each portion of the main portion 12 to elastically deform the same 12. In this case, the elastic-deformation mode of the main portion is not changed by the provision of the damping device, and accordingly the main suspension member 10 or the suspension apparatus including the same 10 can be designed with ease.

The foregoing description relates to the suspension apparatus that is particularly suitable for use with each of the rear wheels of the four-wheel automotive vehicle. However, the present invention may be applicable to a suspension apparatus for use with each of the front wheels of the four-wheel automotive vehicle.

Each of the above-described embodiments relates to the suspension apparatus constituted by the main suspension member and the damping device. Since this suspension apparatus has the simplest construction, it can particularly effectively enjoy the advantages of the present invention. Though this suspension apparatus, constituted by the combination of the main suspension member and the damping device, can satisfactorily achieve the object of the present invention, it may additionally employ the above-described springs 130, or one or more auxiliary links, so as to obtain ideal changes of alignment of the wheel 30.

While the present invention has been described in detail in its embodiments, it is to be understood that the present invention is not limited to the details of those embodiments but may be embodied with various changes, such as those recited in DISCLOSURE OF INVENTION, that may occur to a person skilled in the art.

The invention claimed is:

1. A suspension apparatus for a vehicle having a body and a wheel, comprising, as a main element thereof, a main suspension member functioning as both a suspension spring and a suspension link, and including (a) a main portion which is formed of an elongate material such that opposite ends of the main portion are near to each other, (b) a first body-side attachment portion and a second body-side attachment portion which are provided at the opposite ends of the main portion, respectively, and which are attached to the body of the vehicle such that the first body-side attachment portion and the second body-side attachment portion are pivotable about a first pivotal axis and a second pivotal axis, respectively, each relative to the body, and (c) a wheel-side attachment portion which is provided at a portion of the main portion that is distant from the first and second body-side attachment portions, and which is attached to a wheel-side member that is provided on a side of the wheel,
  wherein the main suspension member is provided such that the main portion has a C-shaped configuration as seen in a lateral direction of the body of the vehicle and a centerline of an axle shaft of the wheel is located in the C-shaped configuration of the main portion, and
  wherein the first and second pivotal axes are inclined relative to each other such that when the first and second body-side attachment portions are pivoted about the first and second pivotal axes, respectively, the main portion is subjected to a twisting elastic deformation that produces an elastic force to support the body of the vehicle.

2. The suspension apparatus according to claim 1, wherein the first and second body-side attachment portions are offset from each other in a direction having a directional component perpendicular to one of the first and second pivotal axes.

3. The suspension apparatus according to claim 1, wherein, in a plan view, the first and second pivotal axes are inclined relative to each other.

4. The suspension apparatus according to claim 1, wherein a first intersection point and a second intersection point where the first and second pivotal axes respectively intersect two extension lines which are respectively extended from opposite ends of a neutral axis of the main portion, are offset from an extension line extended from the second pivotal axis, and an extension line extended from the first pivotal axis, respectively.

5. The suspension apparatus according to claim 1, wherein a reference plane as a vertical plane which passes through (a) a middle point between a first intersection point and a second intersection point where the first and second pivotal axes respectively intersect two extension lines which are respectively extended from opposite ends of a neutral axis of the main portion, and (b) a point on the neutral axis that is, in a plan view, most distant from the middle point, is inclined relative to a front-rear direction of the body of the vehicle.

6. The suspension apparatus according to claim 1, wherein a straight line which passes through a middle point between a first intersection point and a second intersection point where the first and second pivotal axes respectively intersect two extension lines respectively extended from opposite ends of a neutral axis of the main portion, and which extends in a direction as an average of respective directions in which the first and second pivotal axes extend, is inclined, in a view taken in a front-rear direction of the body of the vehicle, relative to a lateral direction of the body of the vehicle.

7. The suspension apparatus according to claim 1, wherein the first and second pivotal axes are inclined relative to each other on a common plane, and an intersection point where one of the first and second pivotal axes intersects an extension line extended from one end of a neutral axis of the main portion, is located on an extension line extended from an other of the first and second pivotal axes.

8. The suspension apparatus according to claim 1, wherein the wheel-side attachment portion is fixed to a specific portion of the main portion that is most distant from the first and second body-side attachment portions in a front-rear direction of the body of the vehicle, is extended from said specific portion toward the first and second body-side attachment portions, and receives, at an extended end portion thereof, a lateral force exerted thereto from the wheel.

9. The suspension apparatus according to claim 1, wherein the first and second body-side attachment portions are attached to the body of the vehicle such that one of the first and second body-side attachment portions is more easily movable relative to the body than an other of the first and second body-side attachment portions, in a direction parallel to a corresponding one of the first and second pivotal axes.

10. The suspension apparatus according to claim 1, further comprising
  two spring-holding portions a distance between which changes as the first and second body-side attachment portions are pivoted by an upward-downward-direction force exerted to the main suspension member from (a) the body of the vehicle and (b) the wheel to which the wheel-side attachment portion is attached via the wheel-side member; and
  an auxiliary spring member which is provided between the two spring-holding portions and which is elastically deformed as the distance between the two spring-holding portions changes.

11. The suspension apparatus according to claim 1, wherein at least a portion of the wheel-side attachment portion is provided in an inner space of the wheel to which the wheel-side attachment portion is attached via the wheel-side member.

12. The suspension apparatus according to claim 1, wherein at least a portion of at least one of the first and second body-side attachment portions is provided in an inner space of the wheel to which the wheel-side attachment portion is attached via the wheel-side member.

* * * * *